US012704384B2

(12) United States Patent
Pčolka et al.

(10) Patent No.: US 12,704,384 B2
(45) Date of Patent: Aug. 11, 2026

(54) RANGE ESTIMATION FOR BATTERY ELECTRIC VEHICLES

(71) Applicant: Garrett Transportation I Inc., Torrance, CA (US)

(72) Inventors: Matej Pčolka, Prague (CZ); Semaria Ruiz Alvarez, Prague (CZ); Petr Turnovec, Jistebnice (CZ)

(73) Assignee: GARRETT TRANSPORTATION 1 INC., Torrance, CA (US)

( * ) Notice: Subject to any disclaimer, the term of this patent is extended or adjusted under 35 U.S.C. 154(b) by 33 days.

(21) Appl. No.: 18/675,575

(22) Filed: May 28, 2024

(65) Prior Publication Data

US 2025/0369767 A1 Dec. 4, 2025

(51) Int. Cl.
*G01C 21/00* (2006.01)
*B60L 58/10* (2019.01)
*G01C 21/36* (2006.01)

(52) U.S. Cl.
CPC .......... *G01C 21/3667* (2013.01); *B60L 58/10* (2019.02); *B60L 2240/62* (2013.01)

(58) Field of Classification Search
CPC ..... G01C 21/3667; B60L 58/10; B60L 58/12; B60L 58/13; B60L 2240/62; B60L 2260/54
See application file for complete search history.

(56) References Cited

U.S. PATENT DOCUMENTS 6,075,346 A 6/2000 Kikuchi et al.
6,154,011 A 11/2000 Lam et al.
6,300,763 B1 10/2001 Kwok
6,388,447 B1 5/2002 Hall et al.
6,674,265 B2 1/2004 Yoshida et al.
7,545,146 B2 6/2009 Klang et al.
7,647,788 B2 1/2010 Okuda et al.
7,847,557 B2 12/2010 Yun et al.
(Continued)

FOREIGN PATENT DOCUMENTS

DE 10158029 A1 6/2002
DE 102010023730 A1 1/2011
(Continued)

OTHER PUBLICATIONS

Al Faruque, et al., "Modeling, Analysis, and Optimization of Electric Vehicle HVAC Systems," IEEE, pp. 423-428, 6 pages. 2016.

(Continued)

*Primary Examiner* — Anne Marie Antonucci
*Assistant Examiner* — Jordan T Smith
(74) *Attorney, Agent, or Firm* — BelayIP

(57) ABSTRACT

Methods and systems for estimating driving range for an electric vehicle. With a given vehicle at a given location and given battery state, which may include battery state of charge, a control system identifies a plurality of potential destinations or routes in different directions from the vehicle. For each destination or route, the control system then uses terrain, traffic and/or other data, along with the battery state, an expected battery state of charge trajectory is calculated. These calculations are used to map the potential range for driving the vehicle. Analogous methods and systems are disclosed for fueled vehicles.

20 Claims, 11 Drawing Sheets

(56) References Cited

U.S. PATENT DOCUMENTS 8,082,743 B2 12/2011 Hermann et al.
8,344,697 B2 1/2013 Lienkamp et al.
8,410,760 B2 4/2013 Formanski et al.
8,417,403 B2 4/2013 Iida et al.
8,527,122 B2 9/2013 Yamada et al.
8,554,473 B2 10/2013 Arcot et al.
8,594,918 B2 11/2013 Meyer-Ebeling et al.
8,754,614 B2 6/2014 Paryani et al.
8,838,318 B2 9/2014 Segawa et al.
8,849,598 B2 9/2014 Mingant et al.
8,872,517 B2 10/2014 Philbrook et al.
9,014,959 B2 4/2015 Kanno et al.
9,079,507 B2 7/2015 Smith et al.
9,132,746 B2 9/2015 Enomoto et al.
9,139,095 B2 9/2015 Kim
9,197,078 B2 11/2015 Lee
9,217,779 B2 12/2015 Xu et al.
9,267,993 B2 2/2016 Farmer et al.
9,328,945 B2 5/2016 Arai et al.
9,358,898 B2 6/2016 Endo et al.
9,535,132 B2 1/2017 Inguva et al.
9,586,579 B1 3/2017 Laskowsky et al.
9,643,469 B2 5/2017 Kakehashi et al.
9,893,394 B2 2/2018 Shin et al.
9,897,664 B2 2/2018 You et al.
10,000,138 B2 6/2018 Tanaka
10,099,569 B2 10/2018 Lindemann et al.
10,107,864 B2 10/2018 Vidhi et al.
10,160,340 B2 12/2018 Lindemann et al.
10,180,460 B1 1/2019 Castelaz
10,209,314 B2 2/2019 Garcia et al.
10,386,422 B2 8/2019 Christensen et al.
10,388,998 B2 8/2019 Choi et al.
10,415,986 B2 9/2019 Meyer et al.
10,471,847 B1 11/2019 Han et al.
10,481,623 B1 11/2019 Forouzan et al.
10,527,678 B2 1/2020 Lee
10,539,621 B2 1/2020 Chow et al.
10,566,817 B2 2/2020 Tkachenko et al.
10,585,146 B2 3/2020 Christensen et al.
10,598,735 B2 3/2020 Lee
10,672,199 B2 6/2020 Landolsi et al.
10,730,401 B2 8/2020 Jin et al.
10,759,303 B2 9/2020 Duan et al.
10,892,631 B2 1/2021 Barsukov et al.
10,931,128 B2 2/2021 Basu et al.
10,962,599 B2 3/2021 Petrucelli
10,989,761 B2 4/2021 Montaru
11,075,414 B2 7/2021 Yokotsuji et al.
11,084,398 B2 8/2021 Marcicki et al.
11,085,969 B2 8/2021 Drees
11,204,391 B2 12/2021 Wampler et al.
11,280,840 B2 3/2022 Chevrier et al.
11,283,103 B2 3/2022 Hong et al.
11,300,620 B2 4/2022 Chen et al.
11,300,626 B2 4/2022 Wampler et al.
11,355,740 B2 6/2022 Holme et al.
11,397,210 B1 7/2022 Peter et al.
11,417,916 B2 8/2022 Duan et al.
11,428,747 B2 8/2022 Ukumori
11,435,405 B2 9/2022 Gong et al.
11,465,529 B1 10/2022 Palombini
11,545,839 B2 1/2023 Sampson et al.
11,567,140 B2 1/2023 Zappen et al.
11,605,849 B2 3/2023 Chuang
11,664,486 B2 5/2023 Xue et al.
11,695,184 B2 7/2023 Roddy et al.
11,703,548 B2 7/2023 Yezerets et al.
11,735,779 B2 8/2023 Junger et al.
12,553,730 B2 * 2/2026 Misawa ............ G01C 21/3469
2006/0091857 A1 5/2006 Nakanishi et al.
2008/0221787 A1 9/2008 Vavrus
2009/0040033 A1 2/2009 Uchida
2009/0114463 A1 * 5/2009 DeVault ................ B60W 20/12
180/65.29
2009/0167253 A1 7/2009 Muraoka et al.
2009/0326749 A1 12/2009 Uchida
2010/0021798 A1 1/2010 Kelly et al.
2010/0049397 A1 2/2010 Liu et al.
2010/0131139 A1 * 5/2010 Sakai ...................... B60K 6/46
903/903
2010/0138098 A1 * 6/2010 Takahara ............ G09B 29/106
701/31.4
2010/0324846 A1 12/2010 Marsh et al.
2011/0032110 A1 2/2011 Taguchi
2011/0077880 A1 3/2011 Gering
2011/0082621 A1 4/2011 Berkobin et al.
2011/0100735 A1 5/2011 Flett
2011/0112781 A1 5/2011 Anderson et al.
2011/0156652 A1 6/2011 Kishiyama et al.
2011/0166810 A1 7/2011 Grider et al.
2011/0184600 A1 7/2011 Kristinsson et al.
2011/0238457 A1 9/2011 Mason et al.
2012/0004838 A1 1/2012 Lee et al.
2012/0029744 A1 2/2012 Yun et al.
2012/0101674 A1 4/2012 Wang et al.
2012/0116620 A1 5/2012 Wang et al.
2012/0116699 A1 5/2012 Haag et al.
2012/0136574 A1 * 5/2012 Kobayashi ............ B60W 20/00
701/533
2012/0143413 A1 6/2012 Cho et al.
2012/0143435 A1 6/2012 Cho et al.
2012/0176231 A1 7/2012 Skaff et al.
2012/0179359 A1 7/2012 Profitt-Brown et al.
2012/0179395 A1 7/2012 Gilman et al.
2012/0232783 A1 9/2012 Calkins et al.
2013/0046428 A1 2/2013 Jordan
2013/0066498 A1 3/2013 Nissato
2013/0069660 A1 3/2013 Bernard et al.
2013/0073113 A1 3/2013 Wang et al.
2013/0079962 A1 3/2013 Ishikawa et al.
2013/0096858 A1 4/2013 Amano et al.
2013/0113424 A1 5/2013 Froelich
2013/0116868 A1 5/2013 Erko et al.
2013/0147432 A1 6/2013 Yamamoto et al.
2013/0151046 A1 6/2013 Choi et al.
2013/0151056 A1 6/2013 Nakano
2013/0169232 A1 7/2013 Middleton et al.
2013/0238189 A1 9/2013 Michaelis
2013/0268152 A1 10/2013 Koshizen et al.
2013/0311016 A1 11/2013 Kim
2013/0317690 A1 11/2013 Fujita et al.
2013/0325335 A1 12/2013 Kee et al.
2013/0332013 A1 12/2013 Malone et al.
2014/0005855 A1 1/2014 Hu et al.
2014/0014421 A1 1/2014 Carpenter et al.
2014/0023905 A1 1/2014 Taniyama et al.
2014/0025255 A1 1/2014 Xiaoli
2014/0028681 A1 1/2014 Hirayama
2014/0046595 A1 2/2014 Segawa et al.
2014/0074329 A1 3/2014 Yang et al.
2014/0143002 A1 5/2014 Aisu
2014/0163854 A1 6/2014 Matsumoto et al.
2014/0172282 A1 6/2014 Feng et al.
2014/0188304 A1 7/2014 Richter et al.
2014/0210415 A1 7/2014 Ohmori
2014/0266059 A1 9/2014 Li et al.
2014/0306519 A1 10/2014 Song
2014/0326430 A1 11/2014 Carpenter et al.
2014/0336965 A1 11/2014 Mori et al.
2014/0338376 A1 11/2014 Carpenter et al.
2015/0002105 A1 1/2015 Kelly
2015/0079433 A1 3/2015 Tamai et al.
2015/0147608 A1 5/2015 Lin et al.
2015/0165919 A1 6/2015 Hughes
2015/0180090 A1 6/2015 Duan
2015/0183293 A1 7/2015 Kim
2015/0258907 A1 9/2015 Lee
2015/0266390 A1 9/2015 Shin et al.
2015/0329003 A1 11/2015 Li et al.
2015/0345972 A1 * 12/2015 Saito ..................... G01C 21/36
701/521
2015/0349385 A1 12/2015 Hu et al.
2016/0016564 A1 1/2016 Otake et al.

(56) References Cited

U.S. PATENT DOCUMENTS

2016/0061610 A1 3/2016 Meyer et al.
2016/0137090 A1 5/2016 Nam et al.
2016/0146895 A1 5/2016 Yazami
2016/0172886 A1 6/2016 Keates
2016/0176309 A1 6/2016 Jeon et al.
2016/0209472 A1 7/2016 Chow et al.
2016/0229411 A1 8/2016 Murata
2016/0238666 A1 8/2016 Kelly
2016/0239592 A1 8/2016 Pourmousavi Kani
2016/0243941 A1 8/2016 Kishida
2016/0285284 A1 9/2016 Matlapudi et al.
2016/0301114 A1 10/2016 Izumi et al.
2016/0311330 A1 10/2016 Liu
2016/0318499 A1 11/2016 Yamanaka et al.
2016/0325637 A1* 11/2016 Payne ..................... B60L 50/16
2016/0332505 A1 11/2016 Yamanaka et al.
2016/0351981 A1 12/2016 Porras et al.
2016/0363632 A1 12/2016 Park et al.
2016/0375782 A1 12/2016 Liu
2017/0003352 A1 1/2017 Barre et al.
2017/0010125 A1* 1/2017 Adachi .............. G01C 21/3469
2017/0028912 A1 2/2017 Yang et al.
2017/0030728 A1* 2/2017 Baglino ............. G01C 21/3469
2017/0067966 A1 3/2017 Min
2017/0088000 A1 3/2017 Payne et al.
2017/0088008 A1 3/2017 Melendez et al.
2017/0092992 A1 3/2017 Duan
2017/0120774 A1 5/2017 Obata
2017/0120775 A1 5/2017 Murata et al.
2017/0129361 A1 5/2017 Scaringe
2017/0133731 A1 5/2017 Hermann
2017/0259687 A1 9/2017 Chikkannanavar et al.
2017/0282739 A1 10/2017 Cha et al.
2017/0305292 A1 10/2017 Minamiura et al.
2017/0352203 A1 12/2017 Jansson
2017/0352930 A1 12/2017 Masias et al.
2018/0017399 A1* 1/2018 Rolnik ............... G01C 21/3469
2018/0053965 A1 2/2018 Marcicki et al.
2018/0118033 A1 5/2018 Lu et al.
2018/0128881 A1 5/2018 Kelly
2018/0226695 A1 8/2018 Miyaki et al.
2018/0236898 A1 8/2018 Ji
2018/0241234 A1 8/2018 Liang et al.
2018/0248396 A1 8/2018 Keates
2018/0287227 A1 10/2018 Jeong et al.
2018/0304765 A1 10/2018 Newman et al.
2018/0340983 A1 11/2018 Li et al.
2019/0043270 A1 2/2019 Hemes et al.
2019/0084399 A1 3/2019 Ohara et al.
2019/0140327 A1 5/2019 Fukada et al.
2019/0176639 A1 6/2019 Kumar et al.
2019/0187212 A1 6/2019 Garcia et al.
2019/0197580 A1 6/2019 Harty
2019/0285704 A1 9/2019 Lee
2020/0011932 A1 1/2020 Hooshmand et al.
2020/0079390 A1 3/2020 Jun et al.
2020/0160619 A1 5/2020 Wang et al.
2020/0198495 A1 6/2020 Rizzoni et al.
2020/0203780 A1 6/2020 Mandli et al.
2020/0212515 A1 7/2020 King et al.
2020/0251788 A1 8/2020 Sood et al.
2020/0300920 A1 9/2020 Christophersen et al.
2021/0016664 A1 1/2021 Deng et al.
2021/0031654 A1 2/2021 Vizzini et al.
2021/0053450 A1 2/2021 Oh et al.
2021/0101504 A1 4/2021 Okamoto et al.
2021/0131812 A1 5/2021 Gong et al.
2021/0138927 A1 5/2021 Maeng et al.
2021/0143391 A1 5/2021 Wood, III et al.
2021/0175547 A1 6/2021 Dahn et al.
2021/0180967 A1* 6/2021 Chae .................... G01R 31/387
2021/0215628 A1 7/2021 Christophersen
2021/0242518 A1 8/2021 Shrivastava et al.
2021/0273270 A1 9/2021 Fujikawa et al.
2021/0284179 A1 9/2021 Diamond et al.
2021/0300197 A1 9/2021 Yi
2021/0309196 A1 10/2021 Son et al.
2021/0328449 A1 10/2021 Li et al.
2021/0344212 A1 11/2021 Jee et al.
2021/0354591 A1 11/2021 Iida et al.
2021/0359317 A1 11/2021 Kaushik et al.
2021/0379999 A1 12/2021 Yang et al.
2021/0382115 A1 12/2021 Woll et al.
2021/0382473 A1 12/2021 Stano et al.
2021/0384753 A1 12/2021 Kozuma et al.
2022/0009367 A1 1/2022 Lee et al.
2022/0057451 A1 2/2022 Viswanathan et al.
2022/0091062 A1 3/2022 Gullapalli et al.
2022/0097557 A1 3/2022 Lee et al.
2022/0105829 A1 4/2022 Nakagawa
2022/0114519 A1 4/2022 Hencken et al.
2022/0131400 A1 4/2022 Nakao et al.
2022/0137149 A1 5/2022 Crane et al.
2022/0149645 A1 5/2022 Ramanujam et al.
2022/0158167 A1 5/2022 Xiao et al.
2022/0166017 A1 5/2022 Su et al.
2022/0221516 A1 7/2022 Lee et al.
2022/0244317 A1 8/2022 Oji
2022/0263144 A1 8/2022 Xie et al.
2022/0268851 A1 8/2022 Epureanu et al.
2022/0282982 A1* 9/2022 Kitada ............... G01C 21/3476
2022/0336809 A1 10/2022 Choi
2022/0343702 A1 10/2022 Pekar et al.
2022/0381835 A1 12/2022 Yang et al.
2022/0407324 A1 12/2022 Jung et al.
2023/0009045 A1 1/2023 Kang
2023/0009288 A1 1/2023 Kang
2023/0015952 A1 1/2023 Kosyakov
2023/0064240 A1 3/2023 Zhou et al.
2023/0093445 A1 3/2023 Kim et al.
2023/0105040 A1 4/2023 Wienhausen et al.
2023/0152385 A1 5/2023 Richter et al.
2023/0173946 A1 6/2023 Foland
2024/0132047 A1 4/2024 Herceg et al.
2024/0132048 A1 4/2024 Dolisnsky et al.
2024/0132066 A1 4/2024 Vosahlik et al.
2024/0262242 A1 8/2024 Poloni

FOREIGN PATENT DOCUMENTS

DE 102011116516 A1 4/2012
DE 102014201349 A1 7/2015
DE 102014201357 A1 7/2015
DE 102017103730 A1 9/2017
EP 2631663 A1 8/2013
EP 2660615 A1 11/2013
EP 2661382 A1 11/2013
EP 2963433 A1 1/2016
EP 3234506 A1 10/2017
EP 3279679 A1 2/2018
EP 1922781 B1 4/2018
EP 3499634 A1 6/2019
EP 3706280 A1 9/2020
EP 3806270 A1 4/2021
EP 3878706 A1 9/2021
EP 4010220 A1 6/2022
EP 4094084 A1 11/2022
EP 4138170 A1 2/2023
EP 4174504 A1 5/2023
EP 4199178 A1 6/2023
WO 2005039919 A1 5/2005
WO 2009020217 A1 2/2009
WO 2010055271 A1 5/2010
WO 2011001609 A1 1/2011
WO 2011072564 A1 6/2011
WO 2012087018 A2 6/2012
WO 2012091076 A1 7/2012
WO 2012140835 A1 10/2012
WO 2013157214 A1 10/2013
WO 2014185163 A1 11/2014
WO 2015045505 A1 4/2015
WO 2015110602 A1 7/2015
WO 2015110603 A1 7/2015
WO 2015174279 A1 11/2015

(56) References Cited

FOREIGN PATENT DOCUMENTS

| | | | |
|---|---|---|---|
| WO | 2016086182 | A2 | 6/2016 |
| WO | 2017071657 | A1 | 5/2017 |
| WO | 2018079164 | A1 | 5/2018 |
| WO | 2018104314 | A1 | 6/2018 |
| WO | 2018112818 | A1 | 6/2018 |
| WO | 2018192190 | A1 | 10/2018 |
| WO | 2019018974 | A1 | 1/2019 |
| WO | 2019113828 | A1 | 6/2019 |
| WO | 2019138731 | A1 | 7/2019 |
| WO | 2019163398 | A1 | 8/2019 |
| WO | 2019181311 | A1 | 9/2019 |
| WO | 2019218769 | A1 | 11/2019 |
| WO | 2019243157 | A1 | 12/2019 |
| WO | 2020041767 | A1 | 2/2020 |
| WO | 2020051738 | A1 | 3/2020 |
| WO | 2020080690 | A1 | 4/2020 |
| WO | 2020131948 | A1 | 6/2020 |
| WO | 2020135481 | A1 | 7/2020 |
| WO | 2020153190 | A1 | 7/2020 |
| WO | 2020191800 | A1 | 10/2020 |
| WO | 2020241001 | A1 | 12/2020 |
| WO | 2020259225 | A1 | 12/2020 |
| WO | 2021014406 | A1 | 1/2021 |
| WO | 2021044132 | A1 | 3/2021 |
| WO | 2021044134 | A1 | 3/2021 |
| WO | 2021118170 | A1 | 6/2021 |
| WO | 2021134746 | A1 | 7/2021 |
| WO | 2021181536 | A1 | 9/2021 |
| WO | 2021185308 | A1 | 9/2021 |
| WO | 2021217662 | A1 | 11/2021 |
| WO | 2021229070 | A1 | 11/2021 |
| WO | 2021229072 | A1 | 11/2021 |
| WO | 2022001977 | A1 | 1/2022 |
| WO | 2022024848 | A1 | 2/2022 |
| WO | 2022024885 | A1 | 2/2022 |
| WO | 2022026336 | A1 | 2/2022 |
| WO | 2022056486 | A1 | 3/2022 |
| WO | 2022065813 | A1 | 3/2022 |
| WO | 2022096898 | A2 | 5/2022 |
| WO | 2022111563 | A1 | 6/2022 |
| WO | 2022119524 | A1 | 6/2022 |
| WO | 2022126254 | A1 | 6/2022 |
| WO | 2022138745 | A1 | 6/2022 |
| WO | 2022143129 | A1 | 7/2022 |
| WO | 2022169652 | A1 | 8/2022 |
| WO | 2022170671 | A1 | 8/2022 |
| WO | 2022174698 | A1 | 8/2022 |
| WO | 2022175146 | A1 | 8/2022 |
| WO | 2022231062 | A1 | 11/2022 |
| WO | 2022244008 | A1 | 11/2022 |
| WO | 2022247991 | A1 | 12/2022 |
| WO | 2022251026 | A2 | 12/2022 |
| WO | 2022268362 | A1 | 12/2022 |
| WO | 2022269538 | A1 | 12/2022 |
| WO | 2023284453 | A1 | 1/2023 |
| WO | 2023035074 | A1 | 3/2023 |
| WO | 2023059652 | A1 | 4/2023 |
| WO | 2023066469 | A1 | 4/2023 |
| WO | 2023072110 | A1 | 5/2023 |
| WO | 2023078590 | A1 | 5/2023 |
| WO | 2023080633 | A1 | 5/2023 |
| WO | 2023124913 | A1 | 7/2023 |

OTHER PUBLICATIONS

Amini et al., "Hierarchical MPC for Robust Eco-Cooling of Connected and Automated Vehicles and Its Application to Electric Vehicle Battery Thermal Management," IEEE, 13 pages. 2020.

Dedek et al., BEV Remaining Range Estimation Based on Modern Control Theory-Initial Study, IFAC-Papers Online, vol. 52, Issue 27, pp. 86-91. 2019.

Hamut et al., "Exergy analysis of a TMS (thermal management system) for range-extended EVs (electric vehicles)," Elsevier Journal, pp. 117-125, 9 pages. Feb. 4, 2012.

Heiskanen, et al., "Generation and Evolution of the Solid Electrolyte Interphase of Lithium-Ion Batteries," Joule 3, pp. 2322-2333, 11 pages. Oct. 16, 2019.

Jog et al., "Dynamic Energy Modeling of Battery Climate System in an Electric Vehicle," Chalmers University of Technology, 78 pages. 2017.

Lahlou, "Energy and Thermal Comfort Management Strategies for Battery Electric Vehicles," Sorbonne University/HAL Open Science, 153 pages. Jun. 2, 2021.

Malmir et al., "A Heuristic Supervisory Controller for a 48V Hybrid Electric Vehicle Considering Fuel Economy and Battery Aging." SAE International by Clemson University Libraries, 10 pages, Jan. 20, 2019.

Murashko Kirill et al., "Modelling of the Battery Pack Thermal Management System for Hybrid Electric Vehicles," Lappeenranta University of Technology/IEEE, 10 pages. Aug. 2014.

Nguyen et al., "Model Selection for Degradation Modeling and Prognosis with Health Monitoring Data," Reliability Engineering and System Safety, vol. 169, pp. 105-116. 2018.

Partial European Search Report for International Application No. 222034290, dated Jul. 18, 2023. (14 Pages).

International Search Report and Written Opinion for International Application No. PCT/US2024/0141149, dated May 21, 2024. (18 Pages).

Randall et al., "Controls Oriented Reduced Order Modeling of Lithium Deposition on Overcharge," Journal of Power Resources. vol. 209, pp. 318-325. Available Online Mar. 7, 2012.

Prasek et al., "Range control MPC with application to Vapor Compression Cycles," Elsevier Journal, 14 pages. Jan. 2020.

Sarvaiya et al., "Comparative Analysis of Hybrid Vehicle Energy Mangagement Strategies with Optimisation of Fuel Economy and Battery Life," Energy, vol. 228, 27 Pages. Aug. 1, 2021.

Suri et al., "A Control-Oriented Cycle-Life Model for Hybrid Electric Vehicle Lithium-Ion Batteries," Energy, vol. 96, pp. 644-653. Available Online Feb. 4, 2016.

Wang et al., "A review on research status and key technologies of battery thermal management and its enhanced safety," Wiley International Journal of Energy Research, 26 pages. Jun. 2018.

Weustenfeld et al., "Heat flow rate based thermal management for electric vehicles using a secondary loop heating and cooling system," Audi AG, 15 pages.

Yan et al., "Battery thermal management strategy for electric vehicles based on nonlinear model predictive control," Elsevier Journal, pp. 1-11, 11 pages. Sep. 4, 2021.

U.S. Appl. No. 18/498,996, filed Oct. 31, 2023.

Azizghalehsari et al., "A Review of Lithium-Ion Batteries Diagnostics and Prognostic Challenges," 47th Annual Conference of the IEEE Industrial Electronics Society, 6 pages. 2021. Accessed Jan. 17, 2022.

Adany et al., "Switching Algorithms for Extending Battery Life in Electric Vehicles," Journal of Power Sources, vol. 231, pp. 50-59. 2013. Available Online Dec. 27, 2012.

WO-2019218769-A1 Machine Translation (Year: 2019).

Bibinsha et al., "Machine Learning Based Battery Aging Management Strategy for Electric Vehicles," 2021 Second International Conference on Electronics and Sustainable Communication Systems, IEEE Xplore, 7 pages. Aug. 2021.

Chen et al., "A New State-of-Health Estimation Method for Lithium-Ion Batteries through the Intrinsic Relationship between Ohmic Internal Resistance and Capacity," Measurement, pp. 586-595, Feb. 2018.

Dong et al., "Lithium-Ion Battery State of Health Monitoring and Remaining Useful Life Prediction Based on Support Vector Regression-Particle Filter," Journal of Power Sources, vol. 271, pp. 114-123. Available Online Aug. 6, 2014.

Barai et al., "A Study of the Influence of Measurement Timescale on Internal Resistance Characterisation Methodologies for Lithium-Ion Cells," Scientific Reports, vol. 8, No. 21, 13 Pages. Published Online Jan. 8, 2018.

Nacu et al., "Lithium-Ion Cell Characterization, using Hybrid Current Pulses, for Subsequent Battery Simulation in Mobility Applications," Processes, vol. 10, 10 Pages, Published Oct. 18, 2022.

(56) References Cited

OTHER PUBLICATIONS

Smith et al., "Lithium-Ion Battery Life Model with Electrode Cracking and Early-Life Break-in Process," Journal of the Electrochemical Society, vol. 168, 17 Pages. Published Oct. 22, 2021.

* cited by examiner

RANGE ESTIMATION FOR BATTERY ELECTRIC VEHICLES

BACKGROUND

Limited driving range, long charging time, and, at least in some regions, limited charging infrastructure each make range anxiety an issue for many drivers of electric vehicles (EVs). EVs often provide an end of range (EOR) alert which is triggered when about 20% of battery capacity remains. The EOR alert may be accompanied by the vehicle indicating that further driving is not advised, or even preventing additional driving. Some drivers reserve a further buffer of up to 20%-30% of battery capacity due to range anxiety by, for example, stopping driving or going to a charging station when the on-dash estimated remaining capacity is at 30% or more. This means that drivers may be interrupting trips with up to half of battery capacity remaining, including even on longer trips. Issues related to range anxiety may limit EV acceptance and/or popularity, and may also lead to sub-optimal operating decisions. For example, battery aging may be accelerated by short charging cycles.

Improvements to EV range estimation are challenging due to uncertainties in future driving conditions, including driving patterns, traffic conditions, environmental factors such as temperature, wind, and precipitation, as well as battery state including non-linearity and aging factors. In addition, remaining available battery capacity is typically estimated from the measured current and the calculated SOC, as it is degrading over time. But both of these input values can also be inaccurate. For example, current sensor outputs include noise and bias errors, while the SOC calculations usually rely on the open circuit estimation, which cannot be directly measured. During operation, only a loaded battery voltage measurement may be available. Although in many EV installations current drawn from the EV battery and current delivered to the EV battery during recharging are monitored to determine remaining available charge on the battery, measurement error can still occur. The battery itself is subject to self-discharge which is not measurable. Translating remaining available battery capacity to a distance/range is not a simple task in view of factors that affect such a translation, including road features (slope, curvature), environmental factors, driver decisions (more or less aggressive driving), and secondary current draw due to cabin comfort and infotainment demands. All of these factors combine to make range estimation challenging.

New and alternative methods, configurable controllers and systems for range estimation in electric vehicles are desired.

Overview

The present inventors have recognized, among other things, that a problem to be solved is the need for new and/or alternative methods, controllers and systems for range estimation in electric vehicles.

A first illustrative and non-limiting example takes the form of a method of generating estimates of end of range for an electric vehicle, the vehicle comprising an electric motor providing drive power to the vehicle, a battery that provides current to the electric motor to use in providing drive power, a user screen for displaying a map to a user, and a controller configured to obtain map information and generate a map on the user screen, comprising: determining each of a current location of the electric vehicle using the map information, and a state of charge (SOC) of the battery; using the determined current location and SOC of the battery: a) identifying a plurality of potential destinations around the current location; b) determining route information for each of the plurality of potential destinations; c) simulating a prediction model for each of the plurality of potential destinations which predicts SOC of the battery along potential routes to each of the plurality of potential destinations using the route information; and d) calculating and reporting to the user via the user screen a battery SOC consumption map based on the predicted SOC of the battery along the potential routes.

Additionally or alternatively, the method further includes displaying on the battery SOC consumption map at least one range indicator each indicating a location at which the battery SOC is predicted to cross a first boundary.

Additionally or alternatively, the at least one range indicator includes: a first range indicator on a first potential route to a first potential destination, the first range indicator showing where on the first potential route the battery SOC is predicted to cross a first boundary; and a second range indicator on a second potential route to a second potential destination, the second range indicator showing where on the second potential route the battery SOC is predicted to cross a first boundary. Additionally or alternatively, calculating the map comprises interpolation using route information for at least two of the plurality of potential destinations to predict battery SOC at a location not simulated with the prediction model. Additionally or alternatively, simulating a prediction model for each of the plurality of potential destinations uses the route information by accounting for at least one of traffic, grade, and curvature of the potential route.

Additionally or alternatively, each of steps a), b), c) and d) are performed as a first iteration of the method, and the method further comprises, after completing the first iteration, determining a new location and a new state of the battery and performing a second iteration of the method, wherein step a) in the second iteration is performed by: determining an estimated maximum distance the vehicle can travel with the new state of the battery; defining a plurality of segments within a region having a radius determined from the estimated maximum distance; categorizing the plurality of segments into filled and unfilled segments by identifying segments as filled if routes from the vehicle to the potential destinations from the first iteration are contained in the segments, and otherwise as unfilled; and identifying a plurality of potential destinations in the second iteration by targeting the unfilled segments.

Additionally or alternatively, step a) is performed by first determining unreachable locations around the vehicle, and omitting the unreachable locations from consideration when identifying the plurality of potential destinations. Additionally or alternatively, step a) is performed by applying one or more rules to space the potential destinations from one another. Additionally or alternatively, step a) is performed without obtaining a destination from the user.

Additionally or alternatively, the method is performed iteratively such that a memory associated with the controller stores a set of previously analyzed potential destinations, and step a) is performed by: defining segments in a map region surrounding the vehicle; identifying first segments which do not contain a previously analyzed potential destination; and identifying the potential destinations in the first segments.

Additionally or alternatively, the memory updates the set of previously analyzed potential destinations on a first-in, first-out basis. Additionally or alternatively, the method further includes determining from the predicted SOC along each potential route a minimum range based on the battery SOC; determining from the predicted SOC along each potential route a maximum range based on the battery SOC; and presenting the minimum range and maximum range to the user of the vehicle.

Additionally or alternatively, the method further includes determining from the predicted SOC along each potential route a non-directional range of the vehicle as a function of the vehicle range on each potential route, and presenting the non-directional range to the user. Additionally or alternatively, the method is performed iteratively such that a memory associated with the controller stores a set of previously analyzed potential destinations and associated simulated routes, and the method further comprises: using a direction of vehicle motion to assign a set of probabilities to simulated routes for each of the stored set of previously analyzed potential destinations; calculating a directional range of the vehicle using a probability-weighted average of all simulated routes; and presenting the directional range of the vehicle to the user.

Another illustrative and non-limiting example takes the form of a method of generating estimates of end of range for a vehicle, the vehicle having an engine consuming a fuel, a fuel tank having a capacity and containing a quantity of fuel, a user screen for displaying a map to a user, and a controller configured to obtain map information and generate a map on the user screen, the method comprising: determining each of a current location of the electric vehicle using the map information, and a quantity of fuel in the fuel tank; using the determined current location and the determined quantity of fuel: a) identifying a plurality of potential destinations around the current location; b) determining route information for each of the plurality of potential destinations; c) simulating a prediction model for each of the plurality of potential destinations which predicts remaining quantity of fuel in the fuel tank along a potential route to each of the plurality of potential destinations using the route information; and d) calculating and reporting to the user via the user screen a fuel consumption map based on the predicted fuel consumption along the potential routes.

Additionally or alternatively, the method is performed iteratively such that a memory associated with the controller stores a set of previously analyzed potential destinations and associated simulated routes, and the method further comprises: using a direction of vehicle motion to assign a set of probabilities to simulated routes for each of the stored set of previously analyzed potential destinations; calculating a directional range of the vehicle using a probability-weighted average of all simulated routes; and presenting the directional range of the vehicle to the user. Additionally or alternatively, step a) is performed without obtaining a destination from the user.

Additionally or alternatively, the method is performed iteratively such that a memory associated with the controller stores a set of previously analyzed potential destinations, and step a) is performed by: defining segments in a map region surrounding the vehicle; identifying first segments which do not contain a previously analyzed potential destination; and identifying the potential destinations in the first segments.

Another illustrative, non-limiting example takes the form of a controller for an electric vehicle, the electric vehicle having an electric motor providing drive power, a battery that provides current to the electric motor to use in providing drive power, a user screen for displaying a map to a user, the controller configured to obtain map information and generate a map on the user screen, the controller further configured to perform a method as in any of the preceding examples.

Another illustrative, non-limiting example takes the form of an electric vehicle comprising an electric motor providing drive power, a battery that provides current to the electric motor to use in providing drive power, a user screen for displaying a map to a user and the controller of the preceding example.

Additional illustrative examples include controllers configured for performing the above methods and/or those that are described in greater detail below, including in an electric vehicle. Some examples include tangible memory storing machine or controller readable instructions for performing the above methods, and/or those that are described in greater detail below, including in an electric vehicle. Finally, some examples include electric vehicles, such as that shown in FIG. 1, having such controllers and/or tangible memory storing such instructions.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
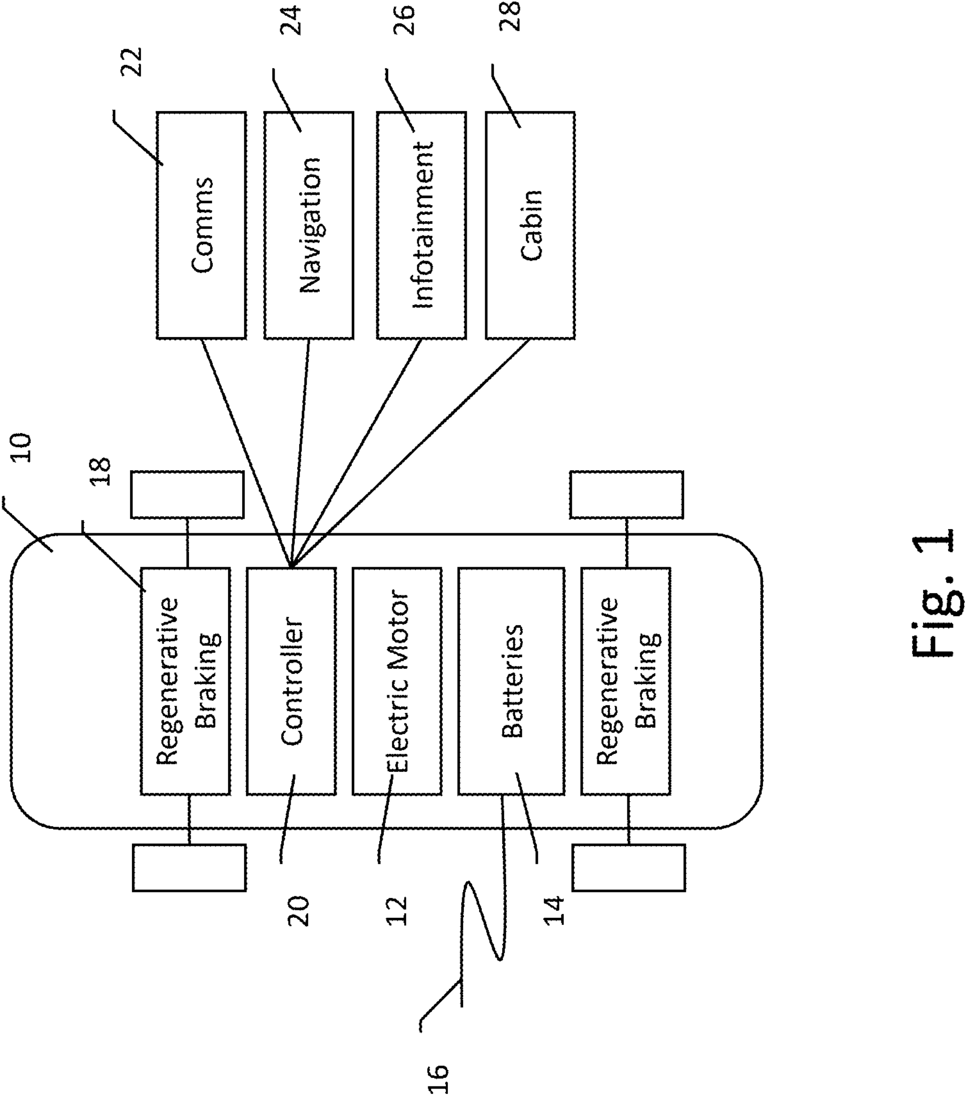
FIG. 1 shows an electric vehicle in a simplified block form.

FIG. 1 shows an electric vehicle (EV) in a simplified block form. The skilled person will recognize that the following discussion may not necessarily describe every feature that would be present in the vehicle 10, to avoid excessive exposition of features that are not necessary to understand the following examples.

The vehicle 10 is characterized by an electric motor 12 (or plural electric motors 12) that provides motive force to the vehicle 10, powered by batteries 14. The batteries 14 are rechargeable by connection 16 to an off-vehicle electricity source, as is known in the art, and may have any suitable chemistry and/or design. Batteries 14 may be associated with various secondary features, such as warming and/or cooling apparatuses to maintain suitable temperatures therein. Regenerative braking 18 may be provided, and serves to at least partly recharge the batteries 14 under suitable braking conditions.

A controller 20 is coupled to each of these blocks, and may further be linked to control blocks for communications 22, navigation 24, infotainment 26, and cabin 28. The controller 20 may, for example, use communications 22 and/or stored data in the navigation 24 to obtain maps and associated map data (road grade, curvature, speed limits, traffic controls), as well as traffic data, weather data, etc. as desired to support the processes that are further described below. The infotainment system 26 and/or cabin 28 include one or more user screens allowing a map and/or other information to be displayed to a user of the vehicle. A "user" may be a driver of the vehicle or, to the extent autonomous or semi-autonomous control is available in the vehicle, the user may be a passenger and/or a person who provides instructions to the autonomous or semi-autonomous control.

The controller 20 is configured for sending and receiving information as well as to provide and/or control power used by, for example, an air conditioning unit intended to cool the cabin 28, or other environmental controls for the cabin 28. The controller 20 may take many forms, including, for example, a microcontroller or microprocessor, coupled to a memory that stores readable instructions for performing methods as described herein, as well as providing configuration of the controller for the various examples that follow. The controller may include one or more application-specific integrated circuits (ASIC) to provide additional or specialized functionality, such as, without limitation a signal processing ASIC that can filter received signals from one or more sensors using digital filtering techniques. Logic circuitry, state machines, and discrete or integrated circuit components may be included as well. Such devices, including engine control units (ECUs) are common in the automotive/vehicle industry, but the skilled person will recognize many different hardware implementations are available for a controller.

The communications 22 may include any of satellite, cellular, Bluetooth, broadband, WiFi, and/or various other wireless communications circuits, antennae, receivers, transceivers, transmitters, etc., as desired. The communications 22 may allow the controller 20 to send and receive data relative to one or more internet, dedicated, and/or cloud-based data receiving and/or processing centers, such as a fleet monitor. In some examples that follow, the communications 22 may be used to upload and/or download data of various types. The navigation system 24 may store, retrieve, receive, and/or display various types of data including, for example and without limitation, weather/environmental data, road data including curvature, posted speed limits, and grade, as well as traffic data, as desired. The navigation system 24 may also be used to provide route instructions to a driver of the vehicle, and/or to provide a route for an autonomous drive controller to use. The navigation system 24 may include a global positioning system (GPS) device for determining and tracking the position of the vehicle 10.

With many EVs range estimation is acceptably accurate when a destination is provided to the vehicle navigation system. A path to the destination can be selected by the navigation system, accounting for driver preferences, usually minimizing one of power consumed, time required, complexity (turns), and/or tolls to select a route. With the known route, various tools can be used to project or estimate battery power consumption through the route using speed limits, road grade and curvature, and traffic conditions, along with external, route agnostic data such as weather, which influences power consumed for the passenger cabin controls. However, for range estimation in the absence of a known route, a blind estimate with less accuracy is generally used, such as by determining a weighted average of short- and long-term driving history to determine power usage per distance unit, for example. Equation 1 illustrates such a calculation:

$$d = f(SOC_k) = a \cdot SOC_k \quad \{1\}$$

Where the parameter "a" may be a historical average distance travelled per unit of SOC. This rough estimate does not take advantage of other data available in the system.

Figure 2:
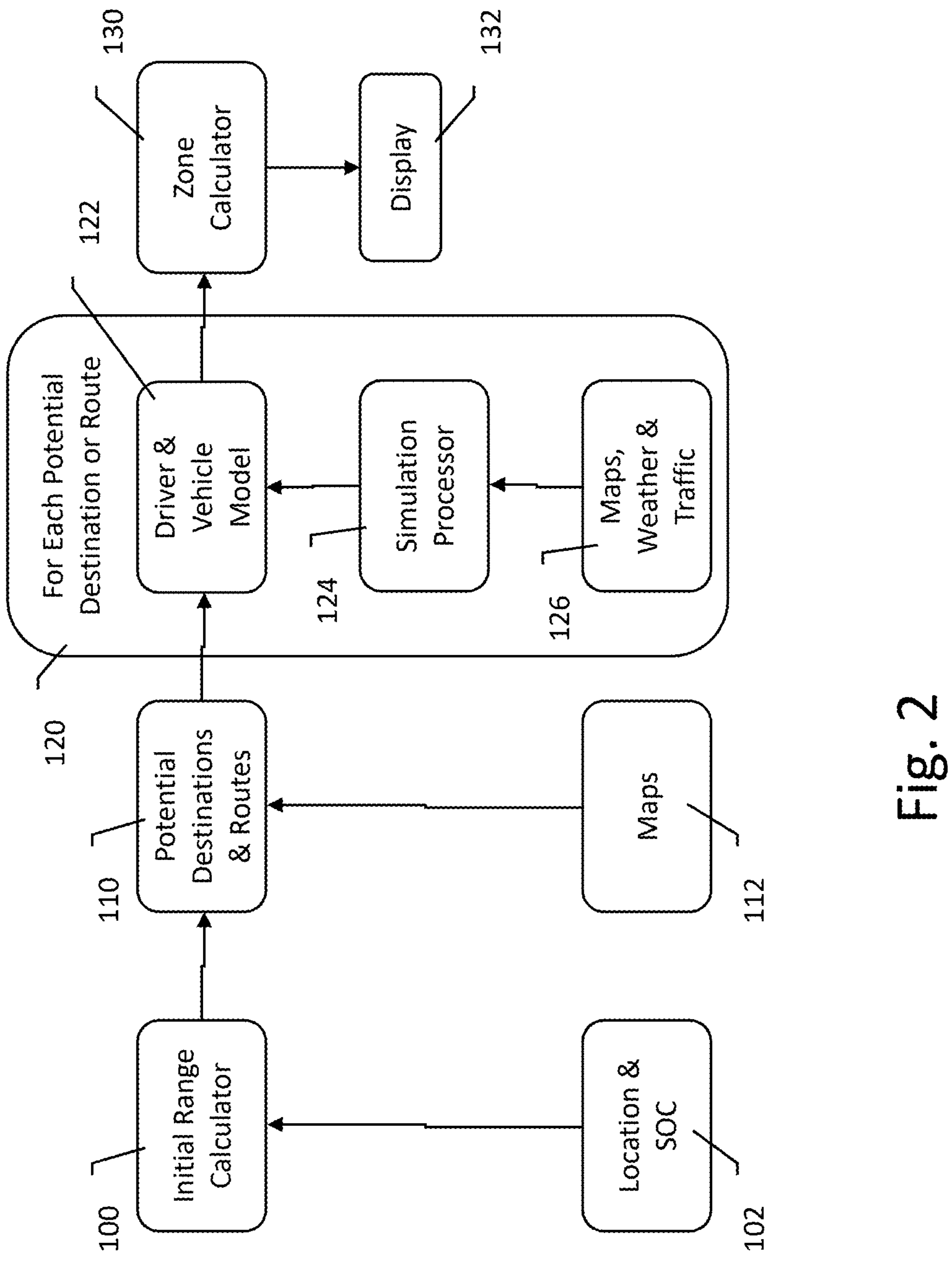
FIG. 2 shows an illustrative architecture for a range estimation system.

FIG. 2 shows an illustrative architecture for a range estimation system of the present disclosure. The range estimation (RE) system includes a collection of algorithms, models and other software modules that may be located/stored in a vehicle controller and associated memory; if desired, one or more of these models and/or modules can be implemented off-vehicle, such as on a remotely accessible cloud server, for example and without limitation. Besides the RE software, the system contains and uses also other vehicle or third-party elements, for example, global positioning system data (GPS), speed, battery SOC, ambient temperature, precipitation and other vehicle sensor systems; maps, routing and navigation data; weather and traffic information services; infotainment system/display; cabin comfort controls and other internal power users of the vehicle, and others.

The architecture in FIG. 2 shows an initial range calculator 100, which provides an initial range estimation by, for example, a formula as in Equation 1, above. The range estimate, which relies in this example on the location of the vehicle and battery SOC, is overlaid on a map, as indicated at 102. It should be noted that some examples herein may be applicable to vehicles using other fuel/power sources, including internal combustion engines, fuel cells, etc., rather than or in addition to (such as hybrid vehicles) the battery. For such other sources of fuel and/or power, where battery SOC and/or battery models are referenced herein, fuel/power system status (fuel gauge, for example), and models of fuel/power usage (combustion engine performance, for example) would be substituted.

The initial range is placed on a map (see description of maps in FIGS. 9-11, below), and can be used to identify potential destinations for the vehicle, as indicated at 110, where potential destinations can be ruled out if they are located beyond the initial range estimate. Block 110 uses available maps 112 to then determine routes to the potential destinations. Routes may be selected/optimized by reference to further data, including any of traffic conditions, curvature and grade, speed limits and other traffic controls, toll roads, weather information, and/or user preferences for route selection. For example, the system may select a route that best reflects driver behavior or preferences, such as routes without any tolls, least travel time to the destination, lowest fuel/SOC consumption, etc. Such preferences may be entered by the driver via a user interface, or the driver's choices made in previous trips may be used to characterize driver behavior.

More than one route to a given destination can be used, if desired, in the simulation. If more than one route to a given destination is simulated, the route best matching driver behavior/preferences may be selected for its use in the simulation, or SOC consumption may be calculated at the destination, as well as points overlapped by multiple routes, as an average of the determined values for individual routes. For example, assuming two different routes result in two different SOC consumption values obtained for the potential destination, the consumption map constructed by the RE software preferably uniquely provides a single SOC consumption value for any GPS location within the map. If multiple SOC consumption values for a position are available, the reference SOC consumption for that position might be calculated as a weighted average, in which the weights applicable to each calculated SOC consumption correspond to the probability of the driver taking one of the routes. For example, the fastest route to a position, D, yields 50% SOC is consumed at that position and the energetically least demanding route to the position D yields only 30% SOC would be consumed after arriving at the position D. Supposing the probability that the driver takes the fastest route is 75%, and the probability that the driver takes the energetically least demanding route is 25%. The reference SOC consumption value for the point D would be calculated as 0.75*50+0.25*30=45. Alternatively, if the two routes are calculated, and one is found to be faster than the other, and the driver's preference is for a faster route, the slower route may be excluded from the mapping.

The simulation and analysis module at 120 uses an iterative loop in which, for each potential destination and/or route, a driver and/or vehicle model 122 receives simulation input profiles from a simulation inputs processor 124. The simulation inputs processor 124 obtains traffic conditions, weather information, curvature and grade, speed limits and other traffic controls, toll roads, from block 126, which may reference a memory and/or off-vehicle communications to obtain these various inputs. The output is a SOC and distance profile for each of the simulated routes, in which the battery SOC (or if another fuel source is assumed, remaining available capacity) is estimated/projected along the distance to the destination at each geographic location (such locations obtained from GPS sources, for example). Any desired level of granularity may be used, for example, and the simulation may determine a profile at discrete points using distance, SOC, or time, as the independent variable. For subsequent processing, SOC may be treated as a function of location/position, such as GPS position. In this example, the system provides SOC as a function of GPS position to the zone calculator 130. In other examples, the zone calculator 130 may receive SOC as a function of distance from the origin.

The zone calculator 130 overlays the SOC and distance profile, and corresponding GPS positions, on the map (see FIGS. 9-11), which is then displayed 132 to the driver/user, allowing the driver to better understand route and destination availability. The display 132 may be map-based; in some examples, high and low RE may be provided, for example, RE={125 km; 175 km} may be a way of displaying the possible range, depending on the destination and driving direction that the driver chooses.

The system may be used both in the case the vehicles do not have a predefined destination, and also when origin and destination are previously established. Also, it provides a new way of assessing reachability of various destinations using the graphical map-based zone representation. In examples, the RE system at 110 receives the current battery SOC and vehicle location, and chooses suitably distributed potential destinations around the vehicle. In addition, the RE system obtains information about the ambient environment (e.g. ambient temperature), road network (e.g. road type/maximum speed limit and road grade along individual roads) and traffic situation (average traffic speed) along the routes between the current car position and the potential destinations. Next, block 120 simulates a set of pre-calibrated prediction models to generate SOC evolution along these potential routes to the various potential destinations suitably distributed across the map. In examples the system, at 130, then creates driving range zones indicating areas in the map reachable with certain remaining SOC. The system may in addition or instead calculate statistical quantifiers of the remaining driving range, for example and without limitation, including one or more of non-directional (omnidirectional) range, directional (only in the probable directions/towards probable areas) range, and minimum/maximum range interval.

Figure 3:
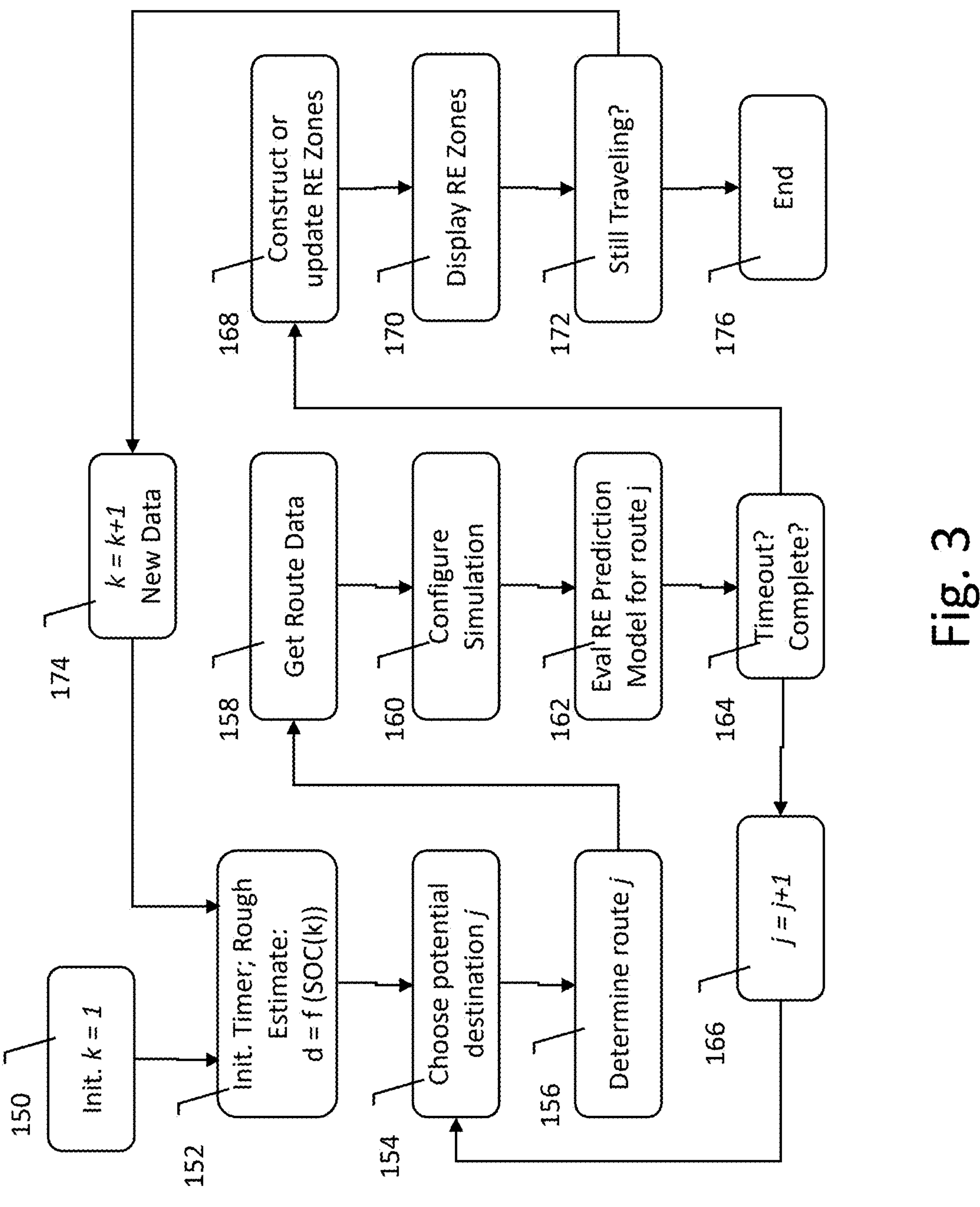
FIG. 3 shows in a block format a range estimation software flow.

FIG. 3 shows in block form a range estimation software flow. FIG. 3 starts at 150 with initialization of the discrete time variable (k=1). Step 150 may be triggered by a vehicle key-on event, for example. If needed, models to be used in the model simulation are initialized, such as by loading parameters thereto, and internal RE software variables are initialized.

In some examples, the RE software is required to refresh the range estimation task within a certain sampling period (e.g. 1 minute, or more or less as needed). This means that all the RE software actions must be finished within that period, and therefore a timer variable is introduced measuring how much time has already passed in the current sampling time. The timer value is regularly checked and compared with a threshold to determine whether the RE software calculations can continue in the current sampling time or whether the RE software actions for the current shall be terminated and the range zone estimate shall be created based on the data which has already been completed. As a result, the next block, block 152, includes a step for initializing the sampling period timer.

Also in block 152, a rough range calculation is performed. This may use a relatively simple formula, such as shown above in Equation 1. The resulting estimate is used to set up the subsequent calculations, including for example, choosing potential destinations and determining routes. If a destination and/or route, when briefly analyzed, fall well outside the rough estimate from block 152, that destination or route may be discarded so that subsequent calculations can focus on likely potential destinations. In addition, the rough estimate can be used as the system output in the event some aspect of the subsequent analysis fails to converge, or if a system failure, such as an application programming interface (API) connection timeout, occurs.

The process then moves to a loop, starting at block 154. To create individual range zones, the RE software will, within its allotted analysis time, consider one or more potential destinations suitably distributed across the map surrounding the vehicle's current (or initial) location. Block 154 starts with a potential destination candidate. If the candidate satisfies the potential destination acceptance conditions, it is accepted as a j-th potential destination. The potential destination acceptance conditions may include, for example, that the potential destination is sufficiently far from any position belonging to any route simulated in the past X minutes (e.g. 15, or more or less). If a potential destination candidate does not satisfy acceptance conditions, another potential destination candidate is selected and tested against the acceptance conditions. In some examples, the driver or user of the vehicle is not consulted or requested to enter a real or intended destination; that is, block 154 may be called without a destination from the user or driver at each instance, since the method is configured to be performed iteratively over time.

Next, at block 156, for the chosen potential destination, the routing/navigation API is queried and the route from the car current position to the chosen potential destination is obtained. If more than one possible route is available, to the potential destination, a route optimization routine may be used to select from available options. Route considerations may include, for example and without limitation, any of traffic conditions, curvature and grade, speed limits and other traffic controls, toll roads, weather information, and user preferences, habits, or pre-entered criteria for route selection. User preferences can be used, for example, to prioritize between routes having greater or lesser travel time, curvature, stoppages, turns, tolls, and/or energy usage. Thus, routes or potential routes may be selected to minimize time, energy cost, or to maximize driver comfort or to meet driver selected criteria (such as avoiding toll roads, or using freeways rather than surface streets). More than one route to a given destination can be used, if desired, in the simulation and, as explained previously, if this is the case, the SOC consumption at locations along the route may be a weighted sum based on likelihood of the driver's selection among routes.

In some alternative examples, the distribution of the potential destinations might be "almost" pre-fixed, for example, distributed along a circle at a fixed or current-SOC-dependent radius, centered at the current car position. In that case, initialization step 150 would load a formula, such that, for example, there are 8 potential destinations, distributed along a circle with the angle step of 45°, the circles radius being is equal to the rough estimate radius d). Then, at step 156, the route between the current car position and the j-th potential destination would be determined. This alternative approach may be used if the real vehicle route is known in advance at the initialization step 150 (if the driver inserts her/his real destination into the navigation system). In that case, the set of all potential destinations for all discrete times might be pre-calculated. Even with such pre-processing and fixed route, it still may be desirable that at least the route to a potential destination j is recalculated at step 156. As real vehicle position may differ from what was pre-planned at the step 150 due to, for example, an unexpected situation on the road. Thus, even with pre-fixed or known route and potential destinations, the process may iterate and recalculate the various potential destinations and re-map SOC to adjust for real world actions.

Route data is then obtained at block 158, and configured for use in the simulation 160. In block 158, preview information for the $j^{th}$ route is obtained, such as by an API with the navigation system. The route data at 158 may include lengths of individual road segments, road type, road elevation, road curvature, traffic information as well as route traffic control information (traffic lights or other traffic control signals, speed limits, etc.), and ambient weather information (temperature and, in some examples, wind speed, wind direction, precipitation forecasts, etc.).

This received data may be configured for use in the simulation at 160 by, for example, converting various details of received data for subsequent use. For example, elevation data may be known for a roadway, as well as location. For use in determining power required for traversing the roadway, the elevation data can be converted to road grade information, and the location data can be used to calculate curvature of the road. From these variables, vehicle speed maximums can be determined; for example, a comfort rule may be used to limit lateral force on the vehicle occupants due to road curvature, which in turn limits the maximum speed the vehicle may have when passing through a curve.

Next, at 162 the system evaluates the incoming data using a prediction model for the $j^{th}$ route. For example, the model 162 receives the route data as configured at 160 and performs simulation of the vehicle SOC evolution as the vehicle progresses along the $j^{th}$ route. In one example, the system may use the route data to first calculate a speed simulation along the route, using a driver model which assumes that the driver will perform certain actions (such as accelerate to the posted speed limit or a prevailing traffic speed and maintain such speed except when the road conditions (curvature for example) limits the speed). From the speed simulation, a power model can be used to determine the amount of power needed to maintain the speed target, accounting for each of vehicle performance, road grade, road curvature, etc. In addition, auxiliary power may be modeled and/or estimated. These results are summed together to determine, for each discrete unit (time, or distance traveled, as desired), the power consumed. Then a battery model (or a fuel model if a non-EV is under analysis) is used to work out the change in battery SOC (or fuel remaining) that results from the power consumption. The evolution of remaining battery SOC (or fuel) is simulated for each destination or route at block 162. Other processes may be used, and additional factors may apply. For example, if the vehicle is a hybrid vehicle, simulation models may include simplified sub-models for power split utilization in the hybrid vehicle and, the reported SOC/remaining fuel will be a combination of combined stored overall energy using a predetermine weighting (as in, Remaining Energy=A*(Remaining Fuel)+B*(SOC), where A and B are weighting factors).

Markers may be set when selected thresholds are crossed, such as at 50% of available SOC (or total SOC). Briefly, total SOC is the physical remaining SOC, while available SOC may be the SOC left before a driver alert of low battery is issued; for example, the driver alert may occur at 20% of total SOC remaining so that the driver is alerted well before actual zero remaining SOC. This approach is used to avoid the difficulty associated with actual zero SOC, which may not only shorten battery life but also can make other steps such as towing a vehicle, more challenging than if some SOC remains.

As noted, the process of analyzing possible routes/destinations is to conclude within a limited period of time. After completion of analysis for the $j^{th}$ route, the system determines whether it has timed out at block 164. If not, the process proceeds to the next route/destination, as indicated at 166, and returns to block 154. If a timeout has occurred at 164, or if the analysis is completed (e.g., all the j destinations are analyzed), the system goes to block 168. The sampling period against which the timeout is determined may be in the range of tens of seconds to a few minutes, for example, and without limitation, 10 seconds to 10 minutes, or more preferably, 30 seconds to about 2 minutes, or more or less.

At 168, the range zones creator is executed/updated, using the models analyzed in blocks 152 and 162 to generate areas in a map that are reachable with the remaining SOC. This function takes the triplets of {longitude and latitude coordinates, SOC} for each point that has been simulated over the past several discrete samples and a consumption map is created. In an example, using this map, such GPS coordinates are then identified for which the remaining SOC is equal to a chosen value (for example 30% for green zone, 15% for orange zone, 0% for red zone). The mapping is then displayed at 170, in a form of range zones. Block 168 may include generating statistics for remaining driving range (directional or non-directional range, and min/max range interval) for reporting to the user.

If the vehicle is still travelling, as indicated at 172, the process returns via block 174, which iterates the discrete time sample, k, and obtains new data and/or measurements.

Figure 9:
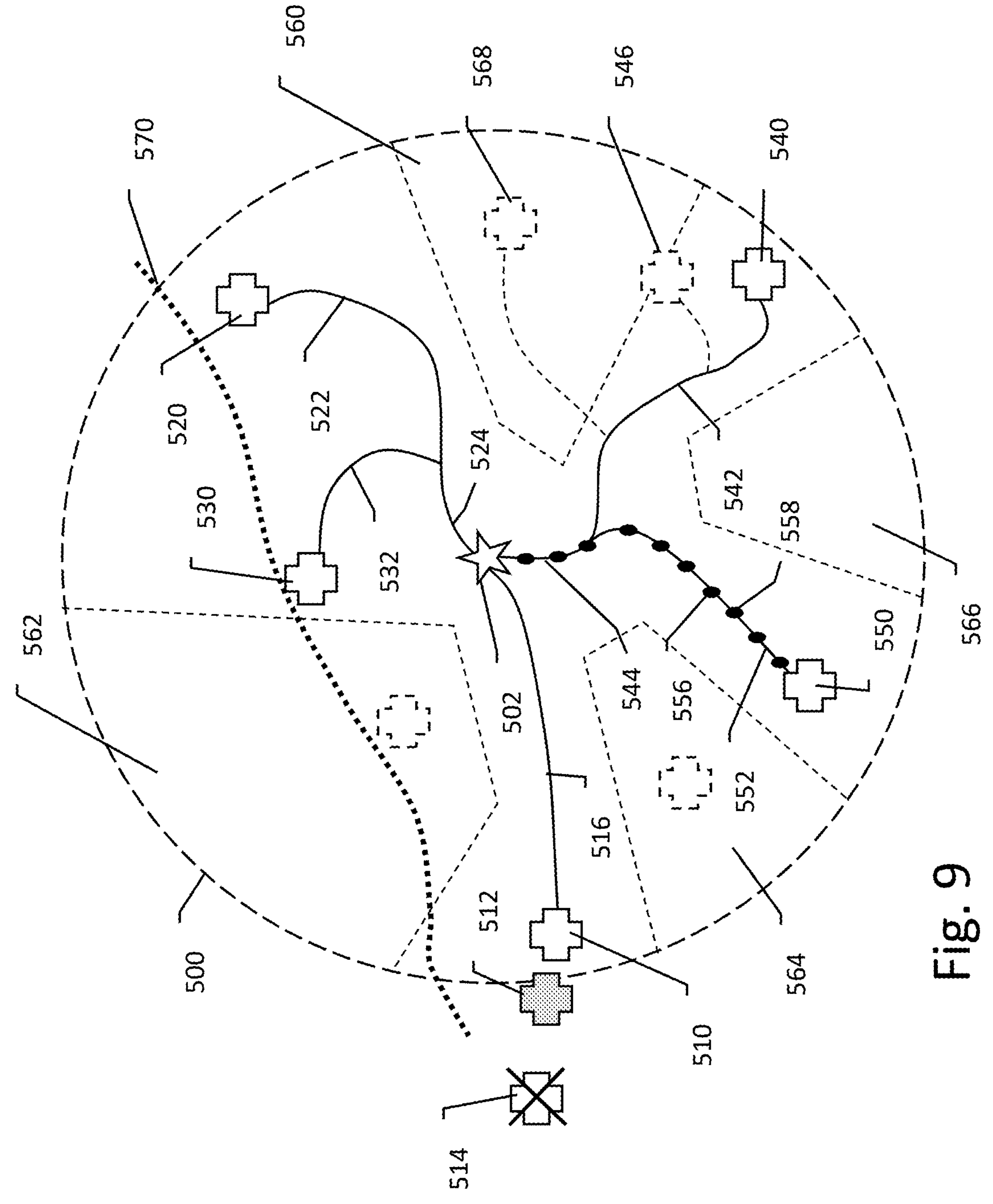
FIGS. 9-11 show illustrative maps with range data overlaid.

If the analysis has completed without a timeout at block 164, the method may include a wait state for the sampling period to finish, implemented within one of block 172 or 174, as desired. New data may refer, for example, to new position data for the vehicle, as well as, if desired, vehicle speed and direction information which can in turn affect route and other calculations/data. New measurements may include, for example, an updated battery SOC. The method then returns to block 152. Upon return, the procedure is performed anew. As illustrated in FIG. 9, each time block 154 is performed to select a potential destination, the map coverage is improved and/or renewed, since each subsequent potential destination is selected, in part, to maximize map coverage in view of previously analyzed potential destination(s). If the vehicle is no longer traveling, the process ends at 176.

The RE system relies on various vehicle models for predictions of SOC consumption profiles. Given a set of potential routes, available road, traffic, and weather information are collected. This information is used for simulating the battery consumption for these potential routes, allowing the calculation of the individual range zones and range statistics. SOC consumption profiles/models are used at two places within the overall RE SW architecture. In one example, a rather simple model may be implemented as a part of the initial range calculator at 152, and a version of this model may use Equation 1, above. In another example, a rather simple model may be combined with the range zone estimates from the previous time instance to provide a rough estimate for the current time instance.

More detailed models are used in blocks 160/162, using driver behavior (speed and acceleration model), electric powertrain (propelling power model), consumption of battery SOC by the non-propelling vehicle systems (auxiliary power model) and the battery SOC evolution (battery dynamics model). Both accuracy and evaluation speed of the models can be balanced against one another. The main assumption for the modelling activities is that the battery consumption evolution can be sufficiently accurately captured by a model in a form of a discrete integrator. Equation 2 is illustrative of one approach:

$$SOC(k+1)=SOC(k)+f(k)\cdot\Delta T(k) \tag{2}$$

Here, a linear dependence between the change in SOC and each of battery dynamics and the period are presumed. The approach of Equation 2 enables the use of "average" influence models per segments (driver, electric power, auxiliary power). It means that the models are built to predict average quantities over specified segments, which in most cases are the road segments for which the road, traffic and weather information is returned. The main feature of such models is that two inputs u1 and u2 yield the same model output after a given time period if their mean values are the same. This feature means that for SOC evolution calculation, faster dynamics (for example short-time oscillations or deviations) of the predicted signals may be neglected as long as the main value of the predicted signals is the same as the mean value of the real signals in the future. Inter alia, it allows for use of simpler (more time-efficient) models working with coarser granularity in terms of route segments over longer routes.

Also, by using an approach as in Equation 2, the conversion between time domain and distance domain is simplified. The models may be built and calibrated with data regularly sampled in the time domain, meaning that ΔT(k) can be constant for each discrete time sample k. Equation 3 shows the distance domain corollary:

$$SOC(k+1)=SOC(s)+f(s)\cdot\Delta T(s)=SOC(s)+f(s)\cdot l(s)/v(s) \tag{3}$$

Where ΔT(s) represents the time to pass through the distance segment, s, which is then the ratio of the length of the segment, l(s), divided by the average vehicle speed, v(s) over that segment. Computation time is reduced by using averages across each segment, and can be further managed by choice of the segment length (typically in the range of about 10 meters to 100 meters, for example). Segment length or time intervals used in the models may be adjusted to shorter lengths/durations as the remaining SOC and/or rough distance (block 152) drops below selected thresholds, or may be rated to remaining SOC or rough distance, providing more granularity as the RE gets smaller.

The RE software may also be configured to assume that the SOC variation in each step is independent of then current SOC, which allows for use of a two-dimensional SOC consumption mapping. With this assumption, not all routes need to be re-analyzed with each simulation step, either, due to change of SOC. Models may thus be designed in a static form and do not depend on past values of any particular variable.

It is generally expected that these assumptions would also apply to non-battery power sources, including fossil fuels, hydrogen or other alternative fuels, fuel cells, etc. Thus, in the preceding examples, as well as following discussion, swapping a different power source for the battery is straightforward.

In some examples, the initial range estimation model 152 provides a simple estimation of the possible range of the vehicle knowing only the current battery state of charge, and this can be true for each of k=1 as well as k>1. While lacking accuracy for various different real-life situations due to its simplicity, it plays a very important role as initialization of other modules of the RE SW and also in case that the communication with APIs is lost. The simple model at 152 provides an initial estimate of the range at the beginning of each sampling period and helps to border the area in which the potential destinations to be later analyzed can be located. In a simple form, the output at 152 provides a radius centered at the current vehicle location. For example, see line 500 in FIG. 9, a simple circle with the current vehicle location 502 at its center. When selecting potential destinations, the system may choose destination 510, inside the circle 500. Location 512, which is just outside the circle 500 may be chosen instead, so that mapping to zero SOC can be ensured, while location 514 may be omitted as being outside of the circle 500 and likely unreachable. Equation 1, above may be used, with the single parameter of the model, a, representing a per-unit-SOC distance that can be traveled, such as, for example, the historical average distance per 1% SOC. In some examples, the simple model (Equation 1, above) is used for k=1, and thereafter (k>1) is augmented using range zone estimates from previous iterations.

For alternative energy sources, this simple model would be adjusted such that the parameter a represents average distance which the vehicle can drive while consuming 1% of full capacity of the available energy source (1% of full fuel tank volume, for example). Instead of percentual SOC of the battery, percent remaining fuel, relative to fully fueled tank, would be considered. More complex models may be used, including for example and without limitation, a historical analysis as in U.S. patent application Ser. No. 18/164,424, filed Feb. 3, 2023, and titled RANGE ESTIMATION FOR BATTERY ELECTRIC VEHICLES, the disclosure of which is incorporated herein by reference.

Returning to FIG. 3, the models used at 162 may include several parts, and may take several forms with a plurality of sub-models. Many of the signals that are input are provided in a distance domain (road grade, speed limits, road curvature, etc.). The model(s) may be configured to provide SOC (or remaining fuel if not a battery) at individual simulation points, specified in the distance domain. Moreover, the distance domain can be provided in terms of distance along the path, rather than geographic distance. Data from different sources may require interpolation to the selected distance sampling length, as needed. For example, speed limits may cover several kilometers, while grade only a few tens of meters, therefore, some interpolation, or averaging, to normalize the discretization may be needed.

Figure 4:
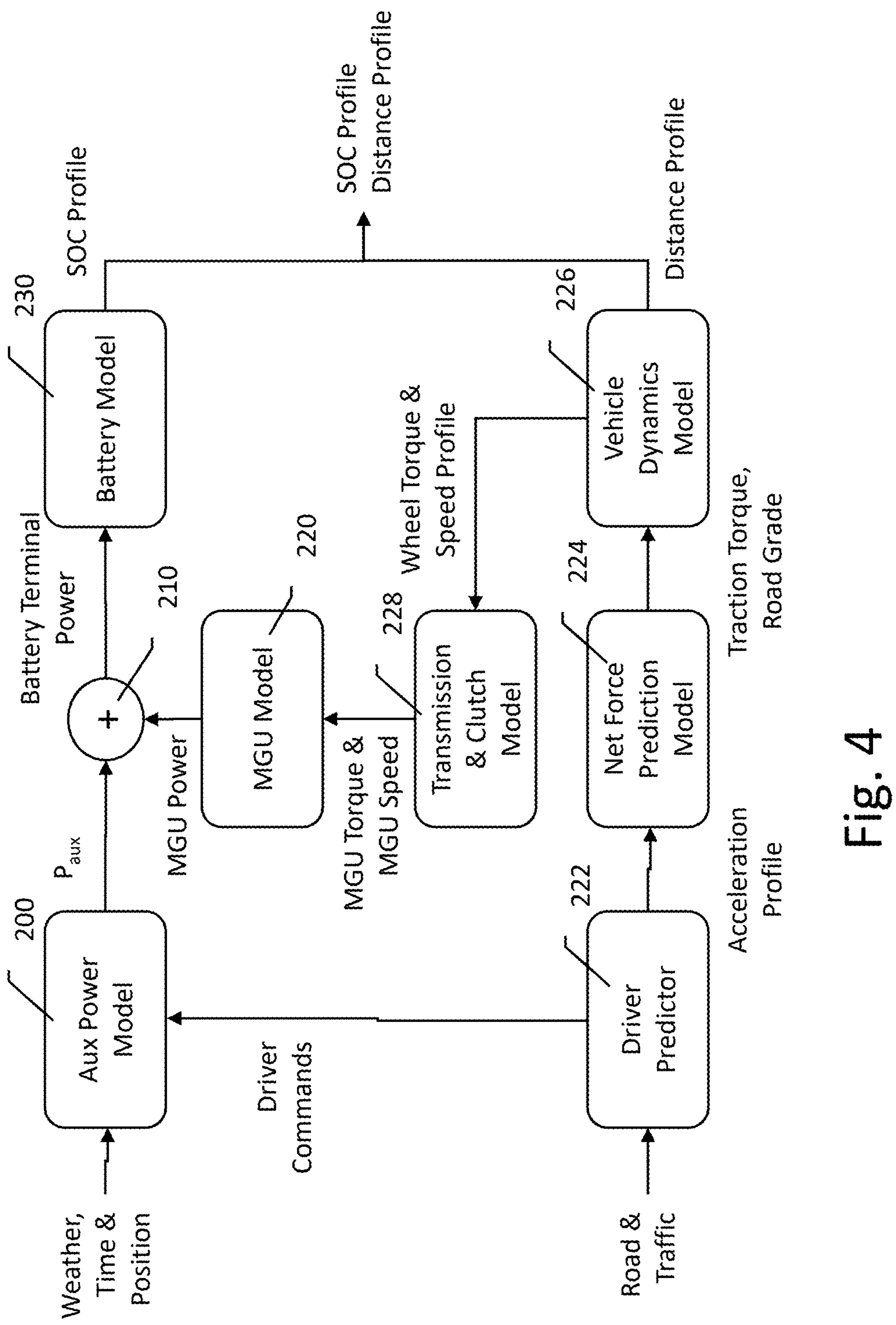
FIGS. 4-8 illustrate model usage in an architecture for range estimation.

FIGS. 4-8 illustrate model usage in an architecture for range estimation. FIG. 4 shows a first example. Here, weather, time and/or position data are provided to an auxiliary power model 200. The auxiliary power model can estimate power used by auxiliary power consumers in the system including those sources that are not directly needed for motive power. Cabin environmental controls, as well as other heating or cooling systems in the vehicle may make up much of this power consumption. Braking as well as steering systems, as well as vehicle specific systems (refrigeration units, hoist, air suspension, etc.) may consume auxiliary power as well. For electric vehicles, battery thermal control systems may consume power to circulate fluid through the battery and coupled cooling or heating systems to maintain the battery in a desired temperature range. For fuel-based vehicles, auxiliary power may include engine cooling systems, as well as other power users, such as power steering, supercharger or electric-assisted turbocharger, emissions control systems, etc. Power consumed by entertainment and illumination systems, as well as engine control systems, can also be modeled. Power drawn by these systems may vary with weather and other factors, as noted. Further, driver commands may also affect the auxiliary power consumption models, as shown. The auxiliary power model 200 can then be summed at 210 with modeled power consumption from the MGU model 220.

The MGU model 220 may rely on several sub-models. A driver predictor 222 may predict driver actions to occur. The driver predictor 222 can be history-based for a given vehicle and driver (i.e. data-driven predictor), and/or may be based on general driver assumptions. For example, the driver may be assumed to control the vehicle to match prevailing traffic speeds or to be constrained by posted speed limits, each of which can be obtained from road and traffic data. In the example shown, the driver predictor 222, combined with route data, can be used to construct desired acceleration and/or speed profiles over the path to the possible destination.

The desired acceleration and/or speed profiles are used along with the route data in a net force prediction model at 224. Here, a physics-based model predicts traction torque and road grade along the vehicle path, which are then provided to a vehicle dynamics model at 226. The vehicle dynamics model 226 determines where the vehicle will be along the route at each distance point, and is one of the system outputs. Wheel torque and speed profile are then provided to the transmission and clutch model at 226. This physics-based model determines transmission and clutch settings that would be used along the route at each distance point. With the transmission/clutch settings predicted, the MGU model 220 can estimate MGU power needed to provide the required torque and speed to allow the vehicle to travel at the speed predicted by the speed profile using the transmission settings predicted by the transmission and clutch model 228. This MGU power is added at 210 to the auxiliary power, to determine battery terminal power 230. Battery terminal power is then used to predict battery current draw at the battery terminal voltage using the instantaneous power formula. The battery model 230 is applied to determine the change in battery SOC that will result from the current draw required to meet the battery terminal power projection. This all yields the SOC profile for the route. In some further examples, more complex battery models, such as considering temperature influences on battery SOC evolution, may be used as desired.

Figure 5:
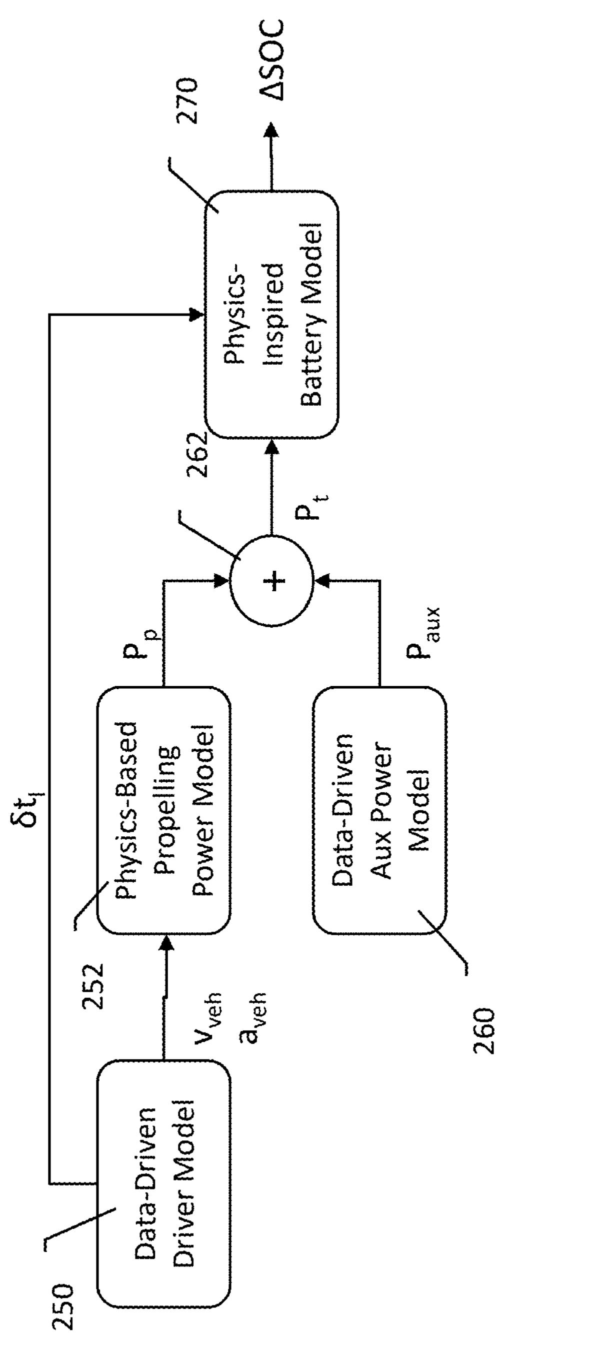

FIG. 5 shows another example of how the models can be used to develop the SOC profile for each route to each possible destination. The model here accepts the preview data in segmented form, and may obtain for example, road segment length, road type (including speed limits) road curvature, and average traffic speed; other inputs may be included and not all of these are required. A data-driven driver model can be used at 250 to predict driver behavior along the route. The output of the driver model 250 may include the average speed of the vehicle over the segment of road ($v_{veh}$), vehicle acceleration in the segment ($a_{veh}$), and (optionally) time needed to travel the road segment ($\delta t_1$). The time needed to travel the road segment may instead be calculated using the average speed and length of the segment in later model steps if needed as in Equation 3, above, where $\Delta T$ is the time spent in the segment, equal to $\delta t_1$ referenced in FIG. 5. It should be noted that the acceleration reported from the driver model may be calculated in several ways, as desired, from basic to more sophisticated. A basic approach would use average acceleration in the segment, and may be sufficient in some examples. If desired, driver differences may be used, such as by considering “aggressive” or “mild” driver approaches, in which case the reported acceleration may be adjusted relative to the average by a weighting or multiplying value, for example.

A more granular approach may use individual accelerations within the segment or segments, so that the internal accelerations within the segment can be tracked to provide a complete power picture. In some examples, the system may underweight negative accelerations (which allow for recuperated power) relative to positive accelerations (which consume additional electric power). If desired, the driver model 250 may use more granular data than what is reported out at the route segment level; that is, the driver model may accept grade or curvature data at a shorter segment length (for example, 5 meter segments) while the system operates on longer segments (for example, 20 meter segments). As a result, multiple steps can be considered within each segment by the driver model when calculating the acceleration and/or velocity in the segment. A quadratic or higher polynomial order term, or more complex term may be used, if desired.

The driver model 250 may be a rule-based driver model, or a neural network or polynomial model, if desired. Multiple tunings may be used for the driver model, such as for aggressive or mild drivers, or driver profiles may be stored for the vehicle according to the driver identity which could in turn be determined from the driver key used to activate the vehicle. As noted, a “driver” model may instead be entirely agnostic to the actual driver, and simply assume that the vehicle will travel using average traffic speed, or at the lesser of prevailing average traffic speed and posted speed limits;

for inclement weather or where traffic data is limited, the system may also track driver behavior within the trip and extrapolate driver behavior for below-posted limit driving (in inclement weather) or above posted-limit driving, as desired. The driver model 250 may also consider comfort and/or safety limits and road curvature, reducing modeled speed when the vehicle must go around a curve or tight turn to reduce sway or passenger/driver discomfort. For an autonomous vehicle, the driver model 250 may instead rely on whatever model has been developed for speed and acceleration control over the autonomous vehicle, using for example a digital twin of the autonomous control system to estimate speed and acceleration profiles.

The next model is the physics based propelling power model 252. The inputs include the vehicle speed and acceleration obtained from the driver model, as well as the road grade and/or road curvature. Equation 4 illustrates a physics-based propelling power model:

$$P_p = \mu_{EM}(\omega, \tau) \cdot K_{rb} \cdot \left( m \cdot v \cdot a + m \cdot g \cdot \cos\theta \cdot c_r \cdot (c_1 \cdot v^2 + c_2 \cdot v) + \frac{1}{2} \cdot \rho_{air} \cdot A_f \cdot c_d \cdot v^2 + m \cdot g \cdot \sin\theta \cdot v \right) \quad \{4\}$$

The function here is static, with each variable in the distance domain. Within the function, $\mu_{em}$ is the electromotor efficiency map, given as a function of the motor speed, $\omega$, and the torque, $\tau$, which would be calculated from predicted vehicle speed and acceleration (including as noted in FIG. 4, any input transmission/clutch predictions). In Equation 4, $K_{rb}$ is a coefficient allowing for modelling acceleration and regenerative braking situations, and may take the form of:

$$K_{rb} = \begin{cases} c_3, & \text{for } a \geq 0 \\ c_4 \cdot \tanh(c_5 \cdot v) & \text{for } a < 0 \end{cases}$$

Where $c_3$ and $c_4$ are model constants; other coefficients can be used. The term, $(m \cdot v \cdot a)$ models the inertial component of the mechanical power needed to propel the vehicle; m represents mass, v is velocity, and a is acceleration. The next term, $(m \cdot g \cdot \cos(\theta) \cdot c_r \cdot (c_1 \cdot v^2 + c_2 \cdot v))$ expresses the rolling resistance contribution, composed of the nominal rolling resistance, $m \cdot g \cdot \cos(\theta)$, times the standard rolling coefficient, $c_r$, and a higher order component, $(c_1 \cdot v^2 + c_2 \cdot v)$, allowing the rolling resistance to be shaped as a function of vehicle speed, wherein g is gravitational acceleration, $\theta$ is the road slope/grade, and $c_1$ and $c_2$ are model coefficients for higher order modeling of the rolling resistance. If desired, a simpler approach may omit the higher order model components. Next, $\frac{1}{2} \cdot \rho_{air} \cdot \Delta_f \cdot c_d \cdot v^2$ represents aerodynamic drag, with $\rho_{air}$ standing for air density, $A_f$ being the frontal area of the vehicle, and $c_d$ being the aerodynamic drag coefficient. Finally, $m \cdot g \cdot \sin(\theta) \cdot v$ reflects the influence of road grade/inclination. In other examples, one or more of these physics-based formulas may be replaced by test-based formulas; for example, vehicle aerodynamic drag can be tested in specialized chambers to provide an alternative formula and coefficients, as desired.

Additional weather-related factors may be used, if desired, in block 252. For example, ambient temperature and/or humidity may be incorporated when determining aerodynamic drag. Further, precipitation or icy conditions be incorporated by adding one or more weights or coefficients to these formulae.

The output of block 252, the propelling power, $P_p$, is then summed with the output of a data-driven auxiliary power model 260, at summation 262. The consumption of the auxiliary power may include all non-propelling power, for example infotainment, cabin heating/cooling/air conditioning, lights, power steering, wipers, etc. For an electric vehicle, this may also include battery thermal controls. Since the most significant portion of this power is expected to be consumed for thermal controls (for battery or other power source, such a combustion engine requiring cooling controls, as well as cabin comfort), the ambient temperature, cabin temperature setpoint, and/or any outputs from the battery control unit indicating battery temperature targets/ranges, may also be inputs to the model at 260. Although physics-based rules could be used, data-driven models are likely to be employed in block 260, as other models may be unnecessarily detailed. A higher order polynomial, or neural network, for example, may be used to estimate auxiliary power $P_{aux}$ if desired. Methods and systems described in U.S. patent application Ser. No. 18/618,850, titled ESTIMATION OF AUXILIARY LOADS IN HYBRID OR BATTERY ELECTRIC VEHICLES FOR FAILURE DETECTION, filed Mar. 27, 2024, may be used to estimate auxiliary power usage, for example. Time of day, precipitation preview, power steering, and/or suspension settings (comfort versus sport suspension, for example) may be incorporated as well.

At 262, the propelling power, $P_p$, and auxiliary power, $P_{aux}$, are summed, yielding a total electric power Pt. The total electric power is passed to the battery dynamics model 270 which is, in this example, physics-based or physics inspired. For example, an RC battery model can be expanded into quasi-polynomial form of Equation 5:

$$f = \alpha_0 \cdot \mathrm{sgn}(P_{tot}) \cdot \sqrt{|P_{tot}|} + \alpha_1 \cdot P_{tot} + \alpha_2 \cdot \mathrm{sgn}(P_{tot}) \cdot P_{tot}^2 + \alpha_3 \cdot P_{tot}^3 \quad \{5\}$$

Where f is the battery dynamics contribution presented in the SOC evolution formulas indicated previously. The internal terms, $\mathrm{sgn}(P_{tot}) \cdot \sqrt{|P_{tot}|}$, $P_{tot}$, $\mathrm{sgn}(P_{tot}) \cdot P_{tot}^2$ and $P_{tot}^3$ are used to allow for sufficient modelling freedom and $\alpha_0$, $\alpha_1$, $\alpha_2$ and $\alpha_3$ are the parameters fitted from the data. The term $\mathrm{sgn}(P_{tot}) \cdot P_{tot}^2$ is used instead of $P_{tot}^2$ to introduce a "signed quadratic" behavior, that is, quadratic behavior, but with the sign corresponding to the sign of total power $P_{tot}$. Similarly, $\mathrm{sgn}(P_{tot}) \cdot \sqrt{|P_{tot}|}$ is used to ensure mathematical feasibility for $P_{tot} < 0$, which may arise, for example, during regenerative braking. More or less complicated formulas might be used. In one example, ambient temperature might be included as additional input with a separate parameter (or parameters, if a more complex relationship is used) into the battery dynamics model. Yet another example is that instead of being constant, the parameters $\alpha_0$, $\alpha_1$, $\alpha_2$ and $\alpha_3$ are fitted as a function of temperature. In such way, the temperature dependent phenomena can be captured. If desired, battery temperature and/or battery health parameters may also be included by having one or more coefficients determined from such parameters (by look-up table, or function) or by an explicit inclusion in the formula. For example, if battery SOC is reported as a percentage of total battery capacity, as the battery degrades then the reported battery SOC will drop more quickly as current is drawn, due to each percent of battery SOC reflecting a smaller quantity of charge.

Equation 3, above, is then used to accumulate battery changes from one position to the next. The result is that block 270, applying a formula such as that shown in FIG. 5, or other formulas (a second order battery model may be used to add the inclusion of battery internal dynamics due to battery health degradation, for example), supplies an output of ΔSOC of the battery, for each segment of the route to each of the possible destinations.

If non-battery energy sources are used (fossil fuel, hydrogen), the driver behavior predictor does not need to change. The electromotor efficiency map, $\mu_{em}$, given as a function of the motor speed, ω, and the torque, τ, would be replaced with an energy source consumption efficiency, $\mu_{esc}$, which may also be a function of suitable variables. For example, for a fossil fuel, the energy source consumption efficiency would again be a function of engine speed and torque. When a non-electric source is used, the auxiliary power consumption may be augmented with a conversion parameter representing losses due to the transformation to electric power. The total energy source consumption would simply be the sum of the auxiliary and propulsion powers. The data output used to estimate state of the energy source to possible destinations would instead rely on the change in energy source capacity along each route segment and may be reported/calculated in terms of percentage of the remaining energy medium (gasoline, diesel, hydrogen, etc.) in the vehicle. Accumulating the route segment changes then allows the tracking to be performed in the same manner as it would be for a battery power source.

Figure 6:
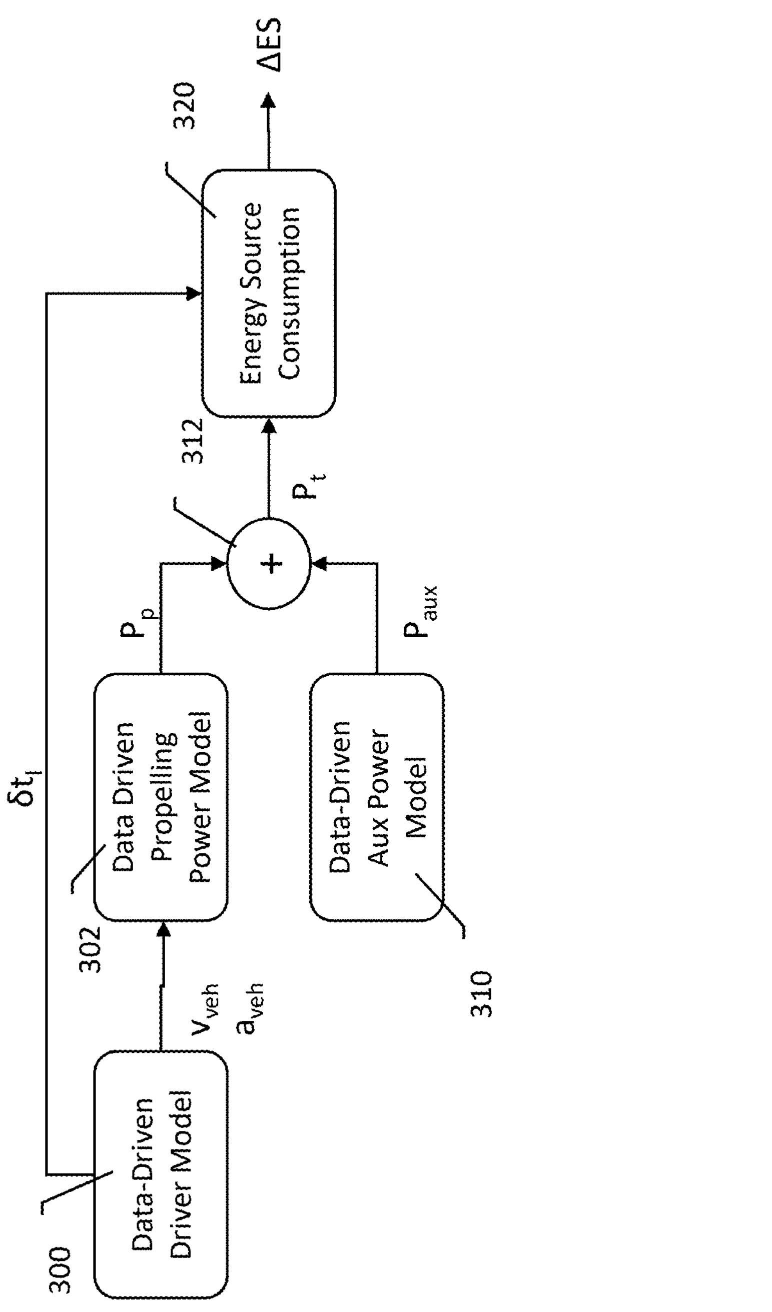

FIG. 6 shows another example. Here, a data-driven driver model 300 is used, as before, and provides velocity and acceleration outputs along with a time-per-road segment value. At 302, rather than a physics driven propelling power model, a data driven propelling power model is shown. In 302, either a neural network or a higher-order multivariate (function of multiple variables) polynomial might be considered. If needed, other nonlinear functions (sigmoids, exponentials, rational polynomials) might be used and the function might be combined in a suitable way, either by summing or multiplying them. Yet alternatively, a certain function of variable A might be fitted in different conditions and its parameters might be further fitted as functions of another variable B. Any other suitable data-driven model is possible. As before, a data-driven auxiliary power model 310 is also used, and the propulsion power, Pp, is summed with the auxiliary power, Paux, at 312 to provide at total power, Pt. Here, at 320, the energy source consumption is referenced, and may be a battery model as in FIG. 5, or may instead be a model for other energy types/sources, such as gasoline, diesel, hydrogen, etc. The output is then a change in the energy source capacity, as indicated.

Figure 7:
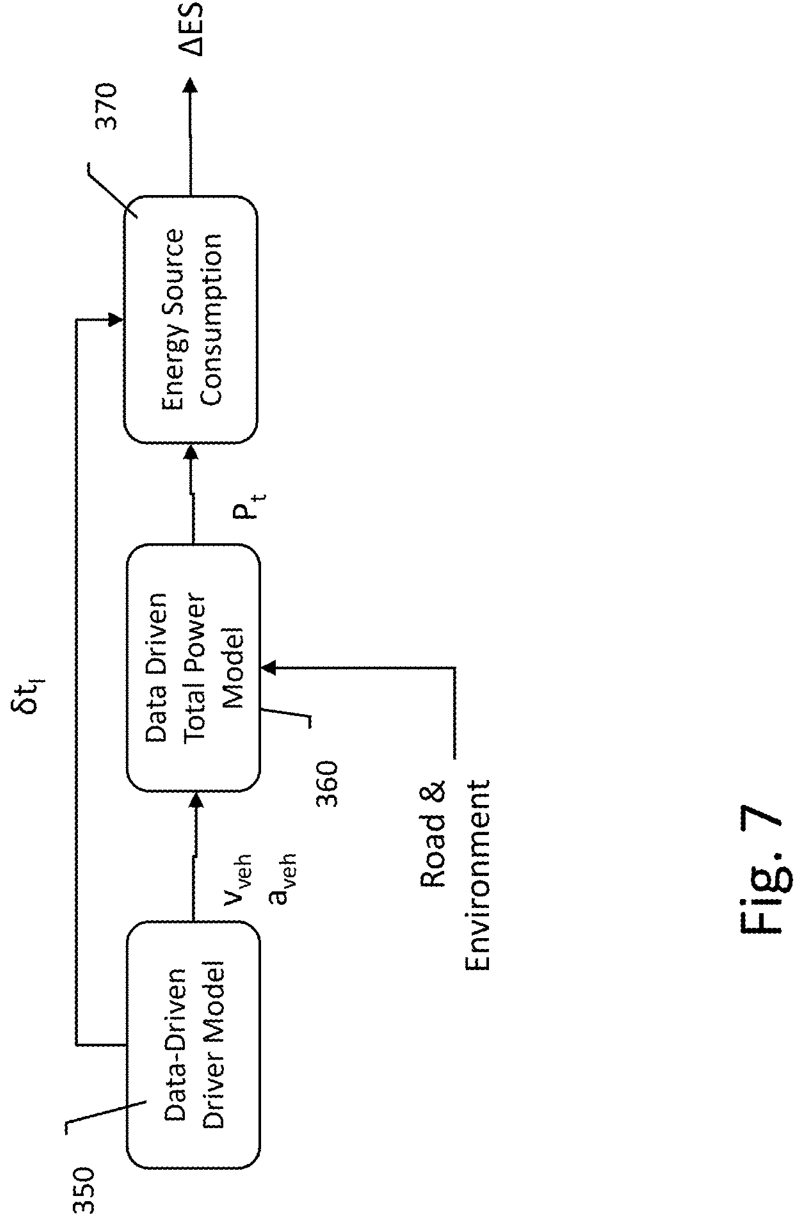

FIG. 7 shows another illustrative example. The driver model 350 is as before, providing speed, acceleration and time in the road segment to other control blocks. In this example, at 360, the two separately fitted models (propelling power and auxiliary power in FIGS. 5-6) are replaced with a single model, calculating total power. The total power consumption, Pt, is then output from block 360 and used to determine the energy source consumption 370 for the route segment, as before.

The lumped, single model at 360 may operate in a continuous or discretized manner. A first variant of the lumped model (variant A) calculates continuous values of changes in energy source capacity (any of battery/electric, hydrogen, diesel, gasoline, etc.) using, for example, a neural network or higher-order polynomial or other chosen nonlinear functions. A second variant of the lumped model (variant B) chooses from a discrete set of potential values for the change in energy source capacity. For example, change in energy source capacity may be selected from a set of discretized values, such as {−1.5, −1, −0.5, 0, +0.5, +1, +1.5}, each expressed as a % of full energy source capacity. Then, for a given combination of inputs to the lumped model (being for example vehicle speed, vehicle acceleration, time per road segment, road grade, ambient temperature, and vehicle thermal demands (cabin and/or battery and/or engine temperature setpoint, for example), the lumped model decides which of the potential change in energy source capacity values is the most probable and passes that value as the output. From the model internal structure point of view, a rule-based decision tree (either manually constructed or automatically tuned) could be used. Another option is to use a neural network which would determine probabilities of each of the plurality of the potential change in energy source capacity values and would pass as the output the one with the highest probability. A hybrid model (internally considering only discrete outputs, but producing a continuous resulting change in energy source values) would be a model that would first calculate the probabilities for each of the plurality of the potential values and the determine the output value as a weighted average of the potential values with the weights corresponding to individual probabilities. Any other reasonable lumped data-driven model combining all the powertrain, auxiliaries, and energy source dynamics might also be used.

Figure 8:
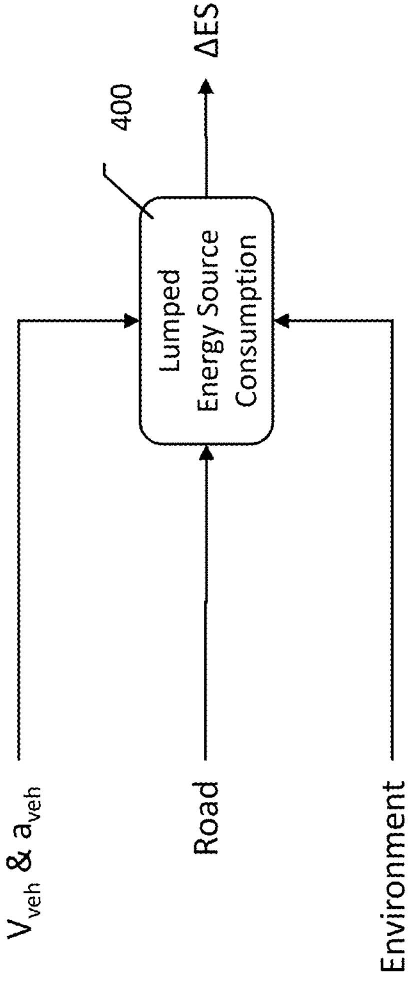

In another example, the prediction models may be structured in an architecture to estimate the change in energy source capacity (battery SOC, or remaining capacity of hydrogen, diesel, gasoline, etc.) directly from inputs in the previous information, without intermediate modeling. Internally, such architecture can use a single lumped data-driven overall energy source evolution model. Since the output is directly the change in energy source capacity, and the model is expected to be data-driven, at least two variants (continuous-valued variant A and discrete-valued variant B) might be implemented. The potential approaches for variant A and variant B correspond to what was presented above. Other internal modeling approaches, such as a hybrid model, may be used. Such an example is shown in FIG. 8, with the lumped energy source consumption 400 as a single block, taking each input and providing the output change in energy source capacity.

Any of the preceding models may be provided in multiple, selectable, variants. For example, multiple driver behavior models (such as aggressive or mild driver) may be stored onboard or in a cloud resource, and used by the RE software as needed. For battery dynamics, multiple models might be considered, each of the used for certain range of operating conditions (for example ambient temperature ranges, or stages of the battery health from new, early life, late life, and nearing replacement). These multiple models might either have all the same internal structure but different set of parameters (e.g. one set of parameters for high temperatures, one for mild temperatures, one for low temperatures), or they can even have different internal structures (e.g. a less complicated structure for high temperatures and a more complicated structure for low temperatures). In one example with two models fitted for two different representative sets of operating conditions, RE SW might evaluate both models in parallel and calculate the resulting ΔSoC profile as a weighted average of the individual model outputs with weights corresponding to proximity of the current operating conditions to the representative operating conditions considered for fitting of the respective models. Similar adjustments that consider other external variables, such as temperature, altitude, and available fuel type (e.g., summer vs. winter diesel mix), might also be implemented for alternative (non-electric) energy sources. Any suitable modelling approach and combination of models is possible.

Referring back to FIG. 2, the RE software may be understood as comprising general modules. A first module includes a potential destination/routes identifier, mainly block 110, but also including block 100 and using information from 102 and 112. A second module includes a creator of individual range zones taking into account simulated data for each potential destination, at block 120. A third module includes the zone calculator 130 which determines the range statistics. Each module may be a component of a software product stored in tangible, processor or other machine-readable form. In some examples, dedicated hardware may be included, such as an application specific integrated circuit (ASIC) for performing recurring math or logic operations, as needed/desired.

In some examples, as shown in the solid lines of FIG. 9, a structure of routes 516, 522, 524, 532, 542, 544, 552 leading from a car position 502 to possible destinations 510, 520, 530, 540, 550 can be represented by a tree-like structure. Current car position 502 is a root of the tree and routes 516, 522, 524, 532, 542, 544, 552 leading to destinations 510, 520, 530, 540, 550 are branches. Routes may comprise nodes which are given by waypoints returned by the map/routing/navigation service. Similarly, as in the tree-like structure, each node (waypoint coordinates) of the route has only one predecessor. This results from the fact that to each potential destination, only a single route and a single sequence of SOC consumption evolution is considered (whether calculated individually or as a weighted sum using driver preference likelihoods, as discussed above). The nodes can have multiple successors (children).

Any suitable criterion for choosing the "optimal" route to the potential destination is admissible including one which may consider multiple routes to a single destination in an energy/power consumption analysis to select the route requiring the least energy, which may not be obvious. For example, a relatively longer, but straighter or flatter route may use less energy than a route with multiple curves or elevation changes; the system may to process such routes using a method as in FIG. 4 to select the energy optimal one. Alternatively, multiple routes to a single destination may be considered and/or analyzed, as it may be that one route or another is more or less energy intensive.

By considering a single route to each destination (or even a limited number, such as 2 or 3), this way, the structure of the already simulated routes or route segments can be stored and then used in the next iteration of the algorithm (for example one RE SW/algorithm iteration per one minute). It may be that the routes are kept consistent from one iteration to the next, even if multiple routes to one destination are analyzed. As shown in FIG. 9, the tree structure is beneficial because the overlapping parts of routes (see segments 524 and 544, for example) can be stored and simulated only once and if some aspects (for example SOC consumption) change for one segment, then that change is automatically propagated to all paths including the affected segment.

One approach that can reduce computational demands is to treat the tree as composed of nodes which represent coordinates in the map through which at least one route to a potential destination passes. A node contains also other information mainly about route segment leading from the parent of the respective node to the node itself (for example distance of that route segment, SOC consumption along the route segment and predicted time of travel through the route segment). Route 552 is shown with nodes highlighted in FIG. 9, where node 556 is considered a parent node (closer to the vehicle 502) relative to node 558. The characteristics of the segment between nodes 556 and 558 do not need to be reanalyzed with each iteration of the analysis, unless something changes form one iteration to the next such as a change in traffic or weather affecting the segment between nodes 556 and 558.

Technically speaking, each node 556, 558 is an object with many properties which can be used in further computations. Most of these properties are associated with a route segment leading into the node. Some properties are associated with the position of the node. In more detail, nodes have the following aspects:

coord—cartesian coordinates of the node, parent—predecessor of the node on a path from the vehicle position 502 to a potential destination 550 (i.e., node 556 is a parent relative to node 558 in FIG. 9), children—an array of nodes containing successors of the respective node on paths from the car current position to potential destinations (i.e., node 558 is a child relative to node 556), SOC_to_parent—SOC consumption corresponding to the route segment from the node's parent to the node, SOC_to_root—overall SOC consumption on a path from root node (car current position 502) to the node, distance_to_parent—distance that needs to be driven from the node's parent to the node, distance_to_root—overall distance that needs to be driven from the root node (car current position) to the node, time_to_parent—predicted time of travel from the node's parent to the node, time_to_root—overall predicted time of travel from the root node (car position) to the node, distance_traveled—distance traveled toward (or towards from—negative) the node during simulation.

Not all of these aspects need to be stored for each node; various combinations may be used. For example, because car current position may change from one iteration to another, the nodes may be constructed to store only the SOC to parent, distance to parent, and time to parent elements, if desired, as those data points would not change in response to change in the vehicle position (assuming that the battery SOC dynamics are constant as the SOC drops). The above listed aspects are not all required in a given implementation, and are not necessarily exhaustive, either. For non-electric energy sources, the above references to SOC would be swapped with energy source change in capacity.

The potential destination/routes set creator module is responsible for identifying suitable choices of the potential destinations. The set creator module balances two partly contradictory factors: model simulation speedup/capacity utilization, and ensuring desired map coverage. Since the time frame for RE software execution is limited by the chosen sampling time (for example 1 minute) and the computational resources of the ordinary battery electric vehicle do not allow for excessive model simulations, RE software models would preferably be executed only as many times as necessary to simulate routes to all potential destinations. From the model simulation speedup point of view, such potential destinations whose routes contain large number of overlapping segments are beneficial. This is because overlapping segments do not need to be simulated multiple times.

However, to enable a reliable and realistic calculation of the individual range zones, each map segment preferably contains a reasonable number of simulated points/routes passing through it. Otherwise, the map may contain "empty" areas (not containing any simulated points, such as shown at 560, 562, 564, 566 in FIG. 9) which may force the zones creator algorithm to interpolate unrealistically in those areas. As a quantification of the map coverage, the percentage of the map area containing some simulated points may be calculated, if desired. Thus, to illustrate these competing interests, in FIG. 9, a potential destination at location 546 would be computationally very efficient, as most of the route to location 546 overlaps that to location 540. However, as can be readily understood, location 546 provides little benefit in terms of filling empty areas on the map.

Figure 10:
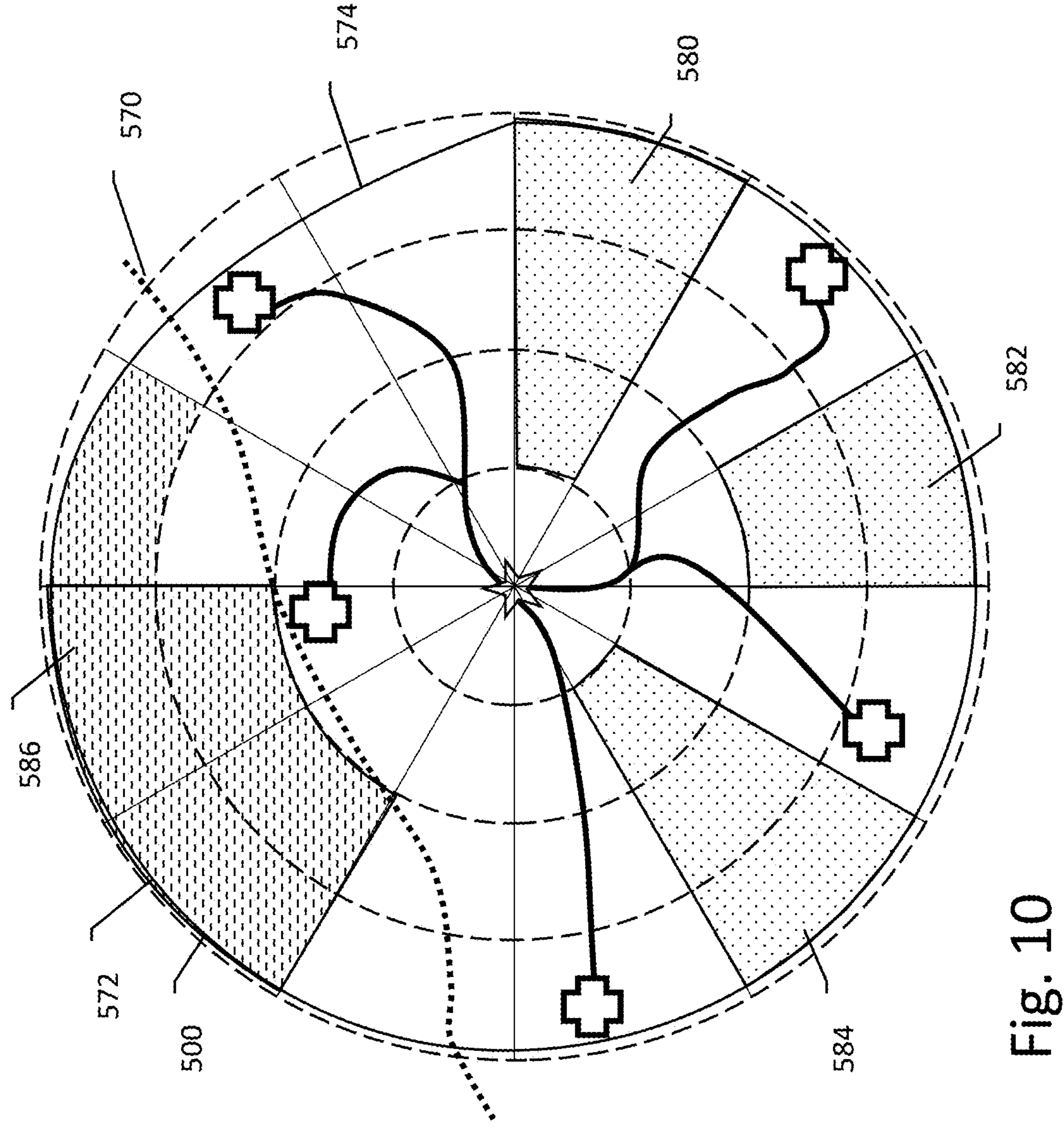

An illustrative example is provided in FIG. 10, which shows the same potential destinations and routes as in FIG. 9, but most details removed for illustrative purposes. The circle 500 is based on the rough initial range estimate, so that only areas inside the circle 500 need to be considered. Within circle 500, the area is broken into 48 segments, and those segments in which either a destination or a route passes are counted as "filled," while the rest are considered "empty." Line weights of routes and destinations are exaggerated to highlight the routes and destinations against the grid of segments. The ratio of filled segments to the total number of segments may be used to quantify the "coverage" of the set of destinations. In FIG. 10, 23 out of 48 segments contain a section of route or a destination, a 48% fill.

When considering fill, geographic limitations can also be contemplated. In FIGS. 9 and 10, line 570 represents a geographic boundary, such as the edge of a body of water or other inaccessible area. The segments that are wholly within the inaccessible area can be omitted from the fill analysis, if desired. For example, each segment in shaded region 586 is inaccessible, and so can be left out of the fill/coverage analysis. Omitting inaccessible segments 586 with FIG. 10 reduces the number of segments from 48 to 43. This increases the fill percentage to 53%, and provides a more accurate understanding. Other approaches to the segment analysis using geographic limitations can be used, as shown below.

Because the process is iterative, over time, additional or different destinations may be selected to increase the "fill" across multiple iterations. For example, in FIG. 3, block 154 is executed with each iteration so that the $j^{th}$ potential destination is selected with consideration of those potential destinations that were previously selected (i.e., j-1, j-2, etc.). That is, coverage may be quantified by determining how many segments were filled in any of the preceding N iterative analyses, where N may be anywhere from 2 to 8, or more if desired. For example, as shown in FIG. 10, regions 580, 582, and 584, each with multiple segments, are empty in the illustrated iteration of the analysis; these regions may be targeted in a subsequent iteration. Moreover, as the vehicle moves, so does the map as the origin tracks the vehicle location. This has the effect of changing the coverage/fill over time as well. A balance can be struck in which the destination set creator chooses a limited number of potential destinations while making selections that maximize the map coverage of the sliding window. Moreover, the destination set creator may be configured to change at least some destinations from one instance to the next. For example, as the vehicle moves, potential destinations that become farther away from the vehicle may be dropped from subsequent iterations, and new destinations selected.

In more detail, the destination set creator works with map segmentation which densifies the information about the distribution of the points to be simulated and enables efficient workflow. At each time instance, first the coverage rating $r_{c,j}$ for all the map segments $S_j$, $j \in \{1, \ldots, N_s\}$ is checked. Here, $N_s$ is a tunable parameter representing the number of map segments. The coverage rating value is calculated as follows:

$$r_{c,j} = \frac{f_{c,j}}{w_{acc,j}}$$

Where $f_{c,j}$ is the coverage rating factor reflecting a quantity of simulated points belonging to the segment j, and $w_{acc,j}$ is the accessibility normalization, expressing what ratio of the segment is accessible. The motivation for normalization here is that two segments with the same area (for example, 10 $km^2$) containing the same number of simulated points, where the first segment is located fully on the land (and thus fully accessible) and the second segment is located half on the land and half in the sea (and thus only half-accessible by car), one can objectively conclude that the second (less accessible) segment is covered twice as well as the first (more accessible) segment. The accessibility normalization is therefore calculated as:

$$w_{acc,j} = \frac{A_{acc,j}}{A_{acc,j} + A_{inacc,j}}$$

Wherein $A_{acc,j}$ and $A_{inacc,j}$ are the accessible and inaccessible areas of the j-th segment, respectively. For the coverage rating factor, this formula may be used:

$$f_{c,j} = \frac{1}{\sqrt{D_j}}\left(\sum_{p \in S_j} c_p\right)$$

Where $D_j$ is the total distance driven inside the j-th segment, and $c_p$ is the contribution of each point p that belongs to the segment ($p \in S_j$). Using $d_{par,p}$ as the distance to the parent node for each point p, the total distance driven inside the segment is calculated as $$D_j = \sum_{p \in S_j} d_{par,p}$$

While the individual contribution is expressed as:

$$c_p = d_{par,p} \frac{1}{z^{t_{sim,p}}}$$

Which combines two types of information: the length of the route segment for which the point p is the terminal point, shown as $d_{par,p}$, and how old the information related to point p is, which is shown as the fraction, where z is a suitably chosen constant (greater than one), and $t_{sim,p}$ is the time since the point was simulated.

Using this set of formulas, the software module obtains information about the distribution of newer points versus older points. If two points correspond to simulated road segments with the same length, but different age, the newer point will contribute more to the coverage rating. The "forgetting" aspect of this approach enables the software to recognize which segments contain older information, so that it can update the data for aged locations more readily. Older data is also discarded (forgotten) after a reasonable window of time as it is recognized that conditions, such as traffic, may change. For example, node data may be deleted after a period of about 10 to about 20 minutes, in some examples, after 15 minutes. The data from prior simulations, related to previously analyzed potential destinations and associated routes, can be discarded on a first-in-first-out basis, after being stored in a memory associated with the vehicle controller. Thus the system uses the stored previously analyzed potential destinations by analyzing coverage of the segmented map as the iterations continue and older stored data is discarded on the first-in, first-out basis. Longer or shorter time windows may be used, and adaptive durations may be used such as by using a longer time window for sparsely populated areas and shorter time windows for higher traffic density regions.

With coverage ratio ($r_{c,j}$) known for each segment, the potential destination/routes set creator module aims to select those segments that have the smallest coverage rating for placing new potential destinations for a subsequent iteration. The software next selects a random candidate point, P from the identified segment having the least coverage rating. For that point, a distance condition is then checked, which can be formulated as:

$$\forall\, \rho_q \in \{\rho \mid q \in 1, \ldots, N_\rho\}: \min\{\|P - p_{\rho_q}\|\}_{p_{\rho_q} \in \rho_q} \geq d_{thd}$$

The left side of the equation indicates analysis of the smallest aerial distance between the candidate point P and any already simulated point, $p_{\rho_q}$, belonging to an already simulated route $\rho_q$, with q being the route identifier and $N_\rho$ being the number of already simulated routes. The inequality then checks whether this smallest distance is larger than a threshold, $d_{thd}$. If the candidate P satisfies the condition, then point P is accepted as a new potential destination. Otherwise, another point in the segment is tried. If the inequality fails repeatedly, the threshold distance can be reduced.

By selecting the segment with the smallest coverage rating, the RE software maximizes effective map coverage, as new potential destinations in each iteration are placed in the sparsely covered map areas. Taking the "age" of the simulated points into account and discarding too-old points helps to maximize the coverage over the chosen time window, which may be in the range of 5 to 20 minutes, or 10 to 15 minutes. The use of segmented data aids in reducing memory requirements and computational burden. In addition, the abovementioned distance condition that is checked for the candidate points allows the control of the map density coverage, since the destinations that are too close to the already-simulated points are not allowed. Finally, the self-adjusting distance threshold $d_{thd}$ propagates the information about how densely the map is covered.

The potential destination/routes set creator needs to get the information about what parts of the map shall be omitted from querying (either because they are physically inaccessible by car, or entrance is barred by political/government limitations, or because they are unreachable because of the battery SOC limitations). In an example, the RE software may characterize map segments as inaccessible or unreachable map segments if a threshold percentage, (for example, 90% of the segment area) is inaccessible or unreachable. Other definitions or inaccessibility/unreachability are possible. Inaccessible areas handling may be performed as a combination of map picture processing, a-priori constraints, and/or on-line inaccessible points detection.

Map picture processing starts with generating a greyscale picture of reasonable neighborhood of the vehicle (for example a radius of 500 km, or a self-adjusting area based on current SOC of the vehicle). To this picture, two alignment points with known GPS coordinates marked in different color (red and blue) may be added to enable straightforward conversion between picture coordinates and geographical map GPS coordinates. Subsequently, the picture is converted into a bitmap and using logical conditioning, the inaccessible points (located in the ocean, for example, and thus corresponding to pixels with white color) are extracted. Finally, using the information about the relative positions of the white pixels with respect to the alignment points and knowledge of the geographical GPS locations of the alignment points, GPS location of the inaccessible points can be calculated. Map picture processing thus provides the rough set of inaccessible points corresponding to the set of white map picture points.

Introduction of a-priori constraints updates the inaccessible points database based on logical constraints for the GPS coordinates. In an illustrative example, the a-priori constraints follow roughly the boundaries across which vehicles cannot pass, whether physically (shoreline), political (country borders), or other. Inaccessible points detection based on both map picture processing and a-priori constraints can be carried out in an off-line manner. This means that these procedures are not executed while the car is driving and the RE software is evaluated. Other thank extreme weather events (road closures due to severe winter storm, or a hurricane, for example), on-line execution for a-priori constraints may not be useful since the logical GPS constraints would be updated infrequently; a special mode or software module may be called if needed in these circumstances during driving. To limit computational burden, a-priori and/or map picture processing may be carried out on a remote server and the results periodically (once per 3 or 5 minutes, or more or less, as needed) communicated with the vehicle.

Another subroutine for inaccessible points handling is on-line inaccessible points detection. For example, when the navigation system is queried to request a route to a certain point, sometimes, no route will be found that would connect it with the current location. As an example, a geographic feature (river, lake, mountain, etc.) may cut across the map in a way that would prevent routing to certain points without having to go outside of the outer circular boundary. Common practice is that if there is at least one accessible point in a 1-km radius from the queried point, the API returns a route from the current car position to that accessible point in the vicinity of the query point. Different radius values (1 km, 2 km, more or less) might apply to individual routing/map/navigation providers. If the query is unsuccessful (no route is obtained), both the query point and also its neighborhood may be added to the database of the inaccessible points.

The potential destination/routes set creator may also be configured to identify and handle excessive SOC consumption areas. Excessive SOC consumption can occur if the simulated route to a destination consumes much more SOC than indicated by the range zones approximation. In such situation, the simulated points with SOC consumption above a chosen threshold (for example set to 120% of the current battery SOC) are removed from the tree and the areas where these points were located are marked as unreachable. Such as case may arise, for example, due to significant elevation changes. By marking such locations as inaccessible, the potential destination/routes set creator can instead distribute potential destinations across areas of the map the vehicle can physically reach considering its current battery state of charge.

The set of inaccessible points/areas might be stored on a remote server and shared not only with the current vehicle, but also with other vehicles that would communicate with the remote server. The remote server may update periodically (once per day, once per two days, or more or less as needed) to ensure that the inaccessible points database is meaningful. If certain areas are only temporarily unavailable (due to temporary road closure, for example), the software may assign an attribute "temporary" and provide updates in accordance with periodicity of the temporary indication. For example, a road which is closed at night and open during the day may have such an attribute.

In FIG. 10, the broken lines at 500 represent the maximum driving radius as would be determined from the initial range estimator. If desired, the system may instead determine a more tailored outer radius for use in the segment analysis shown by FIG. 10. For example, solid line 572 may be the computed maximum radius, and varies with the route calculations and terrain. Thus, region 574 may fall well inside the initial estimate 500 due to, for example, elevation changes. Based on the route analyses, the maximum radius 572 is computed as the spatial distance between the current car position and the furthest point on the SOC consumption approximation map with the SOC consumption corresponding to a certain threshold value (for example set to 120% of the current SOC). At the time step k=1 (when no SOC consumption approximation map is available yet), the maximum radius is chosen to be equal to the value provided by the initial range estimator 500. The procedure starts at the time step k=1. In each of the segments, the procedure then determines whether the outer radius (initially at 500) is outside of all points in the segment. If no point in the segment has been analyzed yet, the initial radius can be retained until a point in the segment is analyzed. If a point in the segment has been analyzed, then the outer boundary for that segment is adjusted (shrunk) by a fixed amount, or to match the outermost of the simulated points in the segment. If a subsequent iteration finds that a point outside of the adjusted outer boundary (or even the initial outer boundary) is reachable, then the outer boundary is adjusted (expanded). Such changes may be continuously updated over time, including as the vehicle moves. The segments are defined in this way with an outer boundary so that the potential routes calculator can ensure spatial coverage without analyzing inaccessible locations.

Attention next turns to the range zones creator, which operates at block 130 in FIG. 2 and/or block 168 in FIG. 3. The range zones creator can be a software module within the range estimation (RE) system software. In other examples, there may be a hardware segregation of features, for example, having the potential destinations and routes function 110 in a first controller with associated memory, the simulation processor 124 in a second controller with associated memory, and zone calculator 130 in a third controller with associated memory, if desired.

The range zones creator, having the simulated points at its disposal, creates an approximation of individual range zones. Range zones are such areas in the map which the car can reach with certain chosen SOC remaining. In a graphical user interface, for example and without limitation, three range zones can be constructed—green range zone (30% of remaining available SOC), orange range zone (15% of remaining available SOC), and red (0% of remaining available SOC). It may be noted that these range zones can include a buffer for remaining battery available, as the driver-reported remaining SOC of 0% may correspond to 20% of actual capacity remaining in the battery, to avoid allowing the driver to actually run the vehicle to zero battery, requiring towing of the vehicle. Any other choice of the zone color and the corresponding remaining SOC is possible.

In an example, the range zones creator can aggregate the information from the simulated routes, and enable approximation of SOC values at locations that have not been directly simulated.

First, the range zones creator performs aggregation of the information from the simulated routes. This may include receiving the relevant outputs of the RE prediction models for the past several consecutive time steps and performing a two-dimensional approximation of SOC consumption as a function of location. The approximation may include finding a mathematical formula relating the consumption of battery SOC with a geographical position in the map. The prediction model outputs may include a set of triplets in a form of {Longitude, Latitude, SOC}, for example. In certain conditions, some simulated points may be excluded, including at least a situation in which the SOC consumption at the simulated point exceeds some realistic threshold (120% of the current SOC), as these are out of range points and there is no need dedicate resources to further analysis thereof. Using this approximation, the range zones creator builds an SOC consumption model for the selected set of locations in the form of a model:

$$\Delta SOC = M(\text{Longitude, Latitude})$$

Next, an interpolation is performed to approximate SOC values at locations that have not been simulated. The range zones creator uses the above model for ΔSOC and finds such set of locations where a chosen SOC value has been reached according to the range zone definition (30%, 15% or 0%, meaning that the driver has already consumed 70%, 85% or 100% of the full battery capacity).

One option is to extract only those simulated points at which the chosen threshold SOC consumption was detected (70%, 85% and 100% of the full battery capacity). Then, three separate approximations (one for each of the three chosen range zones) can be performed such that the individual (green, orange, and red) locations are converted into polar coordinates (angle+radius) and for each zone, the radius is fitted as a function of angle (various sets of functional bases for fitting can be used). The approximated curves are then converted back to the cartesian coordinates and thus, the range zones are obtained. By limiting the analysis to the simulated points at the chosen thresholds, memory and computational effort can be reduced. If memory or computational constraints are an issue, the analysis may be performed at a remote server, if desired.

In another example, a surface approximation of SOC consumption as a function of X and Y coordinates can be used to estimate each of the desired ranges. This may have the advantage of finer granularity, using more of the simulation points to yield a more complete surface with curvature. Further, doing so as a best-fit across all data, rather than with separate curves for each SOC range, avoids issues with non-overlapping range zones where a point could potentially land in more than one of zones. The more granular nature of a surface analysis also allows any chosen SOC level to be analyzed, rather than just the selected zone limits.

The surface approximation can be made using a biharmonic spline approximation. From the mathematical point of view, the biharmonic spline approximation uses a two-dimensional function (a surface) according to the following formula:

$$s(\{x, y\}_q) = \sum_{j=1}^{N_G} w_j \cdot g(\{x, y\}_q, \{x, y\}_{B,j})$$

Here, $s(\{x,y\}_q)$ is the function plane for SOC consumption corresponding to the entry point $\{x,y\}_q$, that is, using x and y coordinates on the two-dimensional plane. The function plane is calculated as a weighted linear combination of contributions from biharmonic (Green) functions, where the j-th Green function is centered at the j-th base point $\{x,y\}_{B,j}$. In the formula above, $w_j$ represents the weight of the j-th Green function, g. A green function centered at a base point $\{x,y\}_{B,j}$ can be evaluated with entry point $\{x,y\}_q$ using this relationship:

$$g(\{x, y\}_q, \{x, y\}_{B,j}) = d(\{x, y\}_q, \{x, y\}_{B,j})^2 \cdot (\ln(d(\{x, y\}_q, \{x, y\}_{B,j})) - 1)$$

Here, $d(\{x,y\}_q, \{x,y\}_{B,j})$ is the Euclidican distance between the entry point $\{x, y\}_q$ and the base point $\{x,y\}_{B,j}$. The biharmonic spline approximation task is to find the individual weights $w_j$ using a least squares minimization:

$$w_j = \arg \min_{q \in \{1, \ldots N_q\}} (SOC_{cons,q} - s(\{x, y\}_q, \{x, y\}_{B,j}, w_j))^2$$

The tuning parameters are then the set of Green function basis locations $\{x_B, y_B\}_j$, $j \in \{1, \ldots N_G\}$, and the measurements represent the triplets $\{\text{Longitude, Latitude, SOC}\}_q$, $q \in \{1, \ldots, N_q\}$. Since the task is linear in the optimized variables $w_j$, the solution can be found analytically and the process is memory and time efficient.

To provide a realistic SOC consumption approximation, the range zones calculator needs to be able to handle various extraordinary situations. One complication arises when there is an old route with too high SOC consumption close to a new route with lower SOC consumption. Such situation can occur when the tree already contains an old (inefficient) route, a new route that is to be added (or its parts) lays close to this old route, and the routes have too different SOC consumptions. This may be addressed by determining whether any older calculated nodes are present within a radius of a newly estimated node. If so, any of the older nodes that are present are then deleted if: (1) the SOC consumption of the older node is much higher than SOC consumption of the new node (using a threshold), (2) the time since the last calculation of the older node is higher than a threshold, and (3) the older node is at least at a certain distance away (tunable parameter) from the current car position. If all of these conditions are satisfied, the older nodes are deleted. Any nodes that then become cut-off (children of the deleted nodes) are also detected and deleted, too.

Another complication arises in handling of spatially close points with too different SOC consumption (here, their "age" is neglected). Such situations are quite common when (1) a route to a destination requires travelling in one direction, a U-turn and travelling the same road in the opposite direction (high-way driving), or (2) when the car passes after a longer distance under/over a point already driven. In this case, the point with lower SOC value (higher SOC consumption) can be discarded. To achieve that, first, a final set $\mathcal{A}$ of triplets later used for approximation is initialized such that the current vehicle position/SOC are assigned to it. Then, the software loops through the list of simulated points and accepts a new point $\{x,y\}_n$ into the final set for approximation $\mathcal{A}$ if the following condition is satisfied:

$$\forall \{x, y\}_a \in \mathcal{A}, |x_n - x_a| \geq tol_s \wedge |y_n - y_a| \geq tol_s$$

Here, the spatial tolerance, $tol_s$, is a tuning parameter. For example, the spatial tolerance can be set to anywhere from 100 meters to 2000 meters, or more or less, such as 1000 meters. Then, for all points $\{x,y\}_a$ in the final set for approximation $\mathcal{A}$, their SOC consumption is computed as minimum SOC consumption of all the original simulated points within the spatial tolerance, $tol_s$. Use of the above-mentioned condition effectively corresponds to spatial resampling of all the original points $\{x,y\}_n$ using a grid with spatial resolution $tol_s$. This approach both reduces the spatial granularity of the points for approximation and uses for approximation locally smallest SOC consumption values. As a result, for problematic points, higher SOC (lower SOC consumption) corresponding to the onward direction is always used.

The range zone creator may have several tuning parameters. For example, the tuning parameters for a biharmonic spline approximation include:

1) the number and distribution of the measurement triplets: $\{\text{Longitude, Latitude, SOC}\}_q$, $q \in \{1, \ldots, N_q\}$.
2) the number and distribution of the Green function basis locations: $\{x_B, y_B\}_j$, $j \in \{1, \ldots N_G\}$ For the number and distribution of the triplets, higher values yield a denser distribution of the "measurement" triplets and thus lead to a more robust spatial representation of the actual SOC consumption. This, however, makes the approximation task also more computationally complex. Likewise, more Green function basis locations provides a more accurate spatial representation of the actual SOC consumption, but adds complexity by increasing the number of the degrees of freedom for the underlying optimization. Such increase can massively increase the overfitting risk. To mitigate the overfitting risk, in an example, $N_q$=10,000, and $N_G$=100 may be selected as the values of these tuning parameters, though other, higher or lower values may be used, as desired and as appropriate to a particular implementation.

To simplify the process of choosing the locations of the measurement triplets and locations of the Green function bases, the tuning parameters can be converted into two distance thresholds as follows: interpolated points threshold, $tol_q = r_{max}/N_q$, and Green function basis threshold, $tol_G = r_{max}/N_G$, where $r_{max}$ is the maximum radius, whether obtained from the rough approximation or using the adjusted values (outer line 500, or adjusted line 574 in FIG. 10). Then, the set of interpolation points locations $\mathcal{J}$ is chosen as the largest subset of simulated SOC points such that:

$$\forall i, j, i \neq j, \{x, y\}_i, \{x, y\}_j \in \mathcal{J} \rightarrow |x_i - x_j| \geq tol_q \wedge |y_i - y_j| \geq tol_q$$

Similarly, the set of interpolation points locations q is chosen as the largest subset of simulated SOC points such that:

$$\forall\, v, W, v \neq w, \{x, y\}_v, \{x, y\}_w \in \mathcal{G} \rightarrow |x_v - x_w| \geq tol_G \wedge |y_v - y_w| \geq tol_G$$

This approach roughly corresponds to choosing the interpolated points and Green function basis locations on a grid with resolution $tol_q$ and $tol_G$, respectively. Other values and methods of adjustment for the tuning parameters can be used, as desired.

To make the range estimation software/system useful for the driver, its outcomes need to be presented in a comprehensive and straightforward way. As indicated above, a graphical approach may include plotting green, orange, and red zones (outcomes of the range zones calculator) together with the crude estimate (provided by the initial range calculator). In some examples, a numerical representation of driving range statistics may be useful to calculate and then present to the user. Such statistics can be calculated at block 130 (FIG. 2) and/or 168 (FIG. 3), for example.

In an illustrative example, and to avoid overcomplicating the displayed information, the following triplet of driving range statistics has been chosen:

1) Driving range interval, which may be presented in a form of [minimum remaining range, maximum remaining range]. The displayed values are calculated as minimum/maximum distance at which threshold SOC has been reached on the simulated routes.
2) Nondirectional average driving range, which may be shown as a single number, the ordinary (nondirectional) average range corresponds to the average driving distance between the current car position and all the points with a chosen threshold SOC.
3) Directional average driving range, which may be shown as a single number, the directional (weighted) average range considers only the most probable driving destinations and calculates the weighted average distance between the current car position and certain (probable) points with a chosen SOC. Here, the weights of individual points correspond to the likelihood that the driver is trying to get to them. Unlike the nondirectional average driving range, where all points are considered independently of their probability, the directional average driving range uses the information available for the current drive and considers only probable destinations for computations.

For a nondirectional range calculation, a total of $N_{ns}$ points are considered for calculation. These points are chosen as all such nodes, q, with the SOC consumption lower than or equal to the current vehicle SOC (or energy source capacity) that do not have child nodes having an SOC consumption lower than or equal to the current SOC. This condition chooses either the terminal point on a route (since the terminal point has no children) or the point whose SOC consumption is the closest to the current SOC from below. Having extracted the points, the nondirectional range is calculated as follows:

$$R_N = \frac{1}{W_{ns}} \sum_{q=1}^{N_{ns}} (w_{ns,q} \cdot d_q)$$

Where $d_q$ is the expected distance based on a simulated point q, that is, distance from the root location (vehicle position). The expected distance can be considered exact if the consumed SOC ($c_{soc}$) is equal to the vehicle SOC; otherwise the distance may be extrapolated to a position between nodes where $v_{soc}$=SOC. The weight, $w_{ns,q}$, is the non-directional weight of the $q^{th}$ point, calculated as:

$$w_{ns,q} = \frac{c_{SOC,q}}{SOC_k}$$

This weight assigns higher importance to the points whose SOC consumption, $c_{Soc,q}$, is closest to the current vehicle SOC because the expected distance is most precise, and does not require any extrapolation. The normalization coefficient, $W_{ns}$, is calculated as the sum of all non-directional weights:

$$W_{ns} = \sum_{q=1}^{N_{ns}} w_{ns,q}$$

Substituting these elements into the RN equation above then:

$$R_N = \left(\sum_{q=1}^{N_{ns}} \frac{c_{SOC,q}}{SOC_k}\right)^{-1} \sum_{q=1}^{N_{ns}} \left(\frac{c_{SOC,q}}{SOC_k} \cdot d_q\right)$$

Turning next to the directional range, in an example, the directional range is calculated as a weighted average of contributions from individual points where the weight of individual points depends on (1) extrapolation (this reflects that for the range calculation, the simulated route needs to reach sufficiently low SOC at its end) and (2) probability (more probable destinations are weighted more).

The directional range can be understood with an example. A vehicle/driver drives on a highway and approaches an exit which would bring the vehicle to a road leading to a point A. While approaching the exit, the point A is probable. If the driver passes by the exit and does not take it, the probability that the driver tries to get to the point A drops significantly. In that situation, point A would be excluded from the group of probable points. A fairly simple updating rule would be that if the calculated distance for the route from the driver to a given point increases from one iteration to the next, that point is not a probable destination. Various nuances may apply.

Selecting the suitable points to use starts from the set of $N_{ns}$ nondirectional points and out of them, the probable points, Nas, are extracted. For example, a point, g, is chosen for calculation of directional statistics if the distance travelled towards it, tag, over a chosen time window is sufficiently large. This condition reflects the fact that during the current drive, the driver has travelled considerable distance towards this point and thus, it is likely that the point may be the driver's intended destination. Mathematically, the condition may be formulated as follows:

$$td_g \geq td_{max} - \max(\sigma_{td}, thd)$$

where $td_{max}=\max\{td_q|q\in\{1, \ldots, N_{ns}\}\}$ is the highest distance travelled towards any point from the potential set, $\sigma_{td}=\sigma(\{td_q|q\in\{1, \ldots, N_{ns}\}\})$ is the standard deviation of the travelled distances, and $t_{hd}$ is a suitably chosen threshold. In some cases, the statistical distribution of driven distances of the set of potential points is biased by some outliers. In such situation, the threshold helps to avoid choosing only this outlier as the single point for directional statistics calculation. Having extracted the points for directional statistics calculation, the directional range is calculated as:

$$R_D = \frac{1}{W_{ds}} \sum_{g=1}^{N_{ds}} (w_{e,g} \cdot w_{dp,g} \cdot d_g)$$

Here, $d_g$ is the expected distance based on the simulated point, g. The weights for the $g^{th}$ point include $W_{e,g}$, the extrapolation weight, and $w_{dp,g}$, the driving probability weight. The equation also includes a directional normalization coefficient, $W_{ds}$. The extrapolation weight may take the form of:

$$w_{e,g} = \left( \sum_{g=1}^{N_{ns}} \frac{c_{SOC,g}}{SOC_k} \right)^{-1} \frac{c_{SOC,g}}{SOC_k}$$

This weight assigns higher importance to the points whose SOC consumption, $c_{SOC,g}$, is closest to the current vehicle SOC because the expected distance is most precise, and does not require any extrapolation. The driving probability weight may be calculated using this formula:

$$w_{dp,g} = \frac{td_g - td_{g,min}}{\sum_{g=1}^{N_{ds}} (td_g - td_{g,min})}$$

Where $t_{dg,min}$ is the minimum driven distance to any point chosen for the directional range statistics calculation:

$$td_{g,min} = \min_{g \in \{1, \ldots, N_{ds}\}} (td_g)$$

The directional normalization coefficient, Was, is calculated as:

$$W_{ds} = \sum_{g=1}^{N_{ds}} w_{e,g} \cdot w_{dp,g}$$

Assembling these formulae together, then:

$$R_d = \left( \sum_{g=1}^{N_{ds}} \left( \sum_{g=1}^{N_{ns}} \frac{c_{SOC,g}}{SOC_k} \right)^{-1} \left( \frac{c_{SOC,g}}{SOC_k} \right) \cdot \frac{td_g - td_{g,min}}{\sum_{g=1}^{N_{ds}} (td_g - td_{g,min})} \right)^{-1} \sum_{g=1}^{N_{ds}} \left( \left( \sum_{g=1}^{N_{ns}} \frac{c_{SOC,g}}{SOC_k} \right)^{-1} \left( \frac{c_{SOC,g}}{SOC_k} \right) \cdot \frac{td_g - td_{g,min}}{\sum_{g=1}^{N_{ds}} (td_g - td_{g,min})} \cdot d_g \right)$$

The directional range calculations are designed such that they use the most probable driving directions. However, tree nodes corresponding to individual simulated points may be deleted after a certain time (for example 15 minutes, or more or less, as needed). To not lose the information about the past directions of driving, this information is aggregated per segments and then propagated into initialization of probability for the newly added routes. Here, segment vs. simulated route/point probabilities are distinguished:

Route/simulated point probability is the information about the road distance travelled with respect to the route/simulated point. Here, various weighting of the positive/negative travelled distance is possible (for example if the car travels to a certain point, the travelled distance with respect to that point increases at different rate than how it decreases when the car travels away from that point).

Segment probability is the aggregated probability of all the simulated points belonging/being close to the segment. For the segment probability calculation, a weighted average (for example 0.8 vs. 0.2) of the internal points vs. neighboring segments is used.

Every time a new route is added to the tree, initialization of its probability and probabilities of its points may be carried out:

At its local root, the route is initialized from the existing connecting route. This enables to use the non-aggregated information from the latest simulations, which is locally most valid information that the algorithm has at its disposal.

Towards the end of the newly added route, the probabilities smoothly transition to the segment probability. This way, the generalized information in the map area aggregated per segments is utilized, and the method may retain information even from previously simulated routes that have already been deleted from the tree.

The RE software may be further configured to handle both the case when the real driving destination is unknown and the case when its known. The description above focused mostly on the first (more complicated) case, with no known destination. The adjustment for the latter case (destination known) would be as follows:

1) The intended driver's destination shall be periodically queried (directions from the current car position to the destination; road grade, traffic situation and weather forecast along the route) and the prediction models are simulated, for example every 10 minutes, or more or less (in some examples, a shorter period than the standard time window after which the "too old" nodes are deleted from the tree). This ensures that the algorithm periodically gathers information about SOC evolution towards the intended destination.

2) The directional range calculation would be adjusted. For example, the point for directional statistics calculation belonging to the intended route would be assigned a considerably higher probability (e.g. 2 or 3 times higher) than all the other points chosen for directional statistics calculation.

Some examples may also include adjustment for driver habits. In one example, a set of POIS (points of interest) might be considered. First, a small set of POIs (at most 5 points: home, work, shopping center, etc.) would be created. This can be done either through manual entry or automatic detection from the navigation/GPS position history. The creation of POIs may include temporal statistics (for example, the POIs can be time-dependent, based on day of the week, time of day, etc.) or may include spatial statistics (a different set of POIs can be created for different geographical areas and based on the current area in which the car is located, the corresponding set of POIs would be used).

Next, a switch (on/off) ensuring that the POIs are at each time instance part of the set of potential destination would be introduced. If the switch is on, the relevant POIs are chosen (either driver-entered POIs or POIs based on the spatial and temporal information—current geographical area, current day of week/time of day, etc.) and automatically periodically queried (e.g. every 10-15 minutes) as to at least some of the potential destinations. By doing so, the driver would always be kept up-to-date about the range with respect to the POIs. Then, the relevant driving range info using the driver habits knowledge would be calculated/shown. One example of adjustment is related to the directional statistics. Here, the idea is to adjust the probability of the individual simulated points (areas) based on the statistics (spatial, temporal)—for example reflect the distance of the simulated points from a frequently visited areas when calculating the probabilities for the directional statistics. Yet another adjustment would be introduction of the POI-related statistics. For example, if a POI is reachable, (i) the remaining SOC after reaching the POI could be displayed, and/or (ii) the expected (extrapolated) range on the route from the current point to the POI would be displayed (how far the car could reach with the current SOC if the average SOC consumption corresponds to the route from the current position to the POI). If the POI would not be reachable with the current battery status, the remaining range on the route from the current position to the POI (how far on the route from the current position to the POI) would be displayed.

The above is a detailed introduction to one illustrative example. It should be understood that a variety of alternatives and adjustments may be used instead, and no particular feature is considered irreplaceable or necessary for all examples. As noted previously, for non-electric energy sources (for example gasoline, or diesel, or hydrogen), the SOC and SOC consumption discussions would be replaced with its equivalent of energy source state/energy source consumption.

Figure 11:
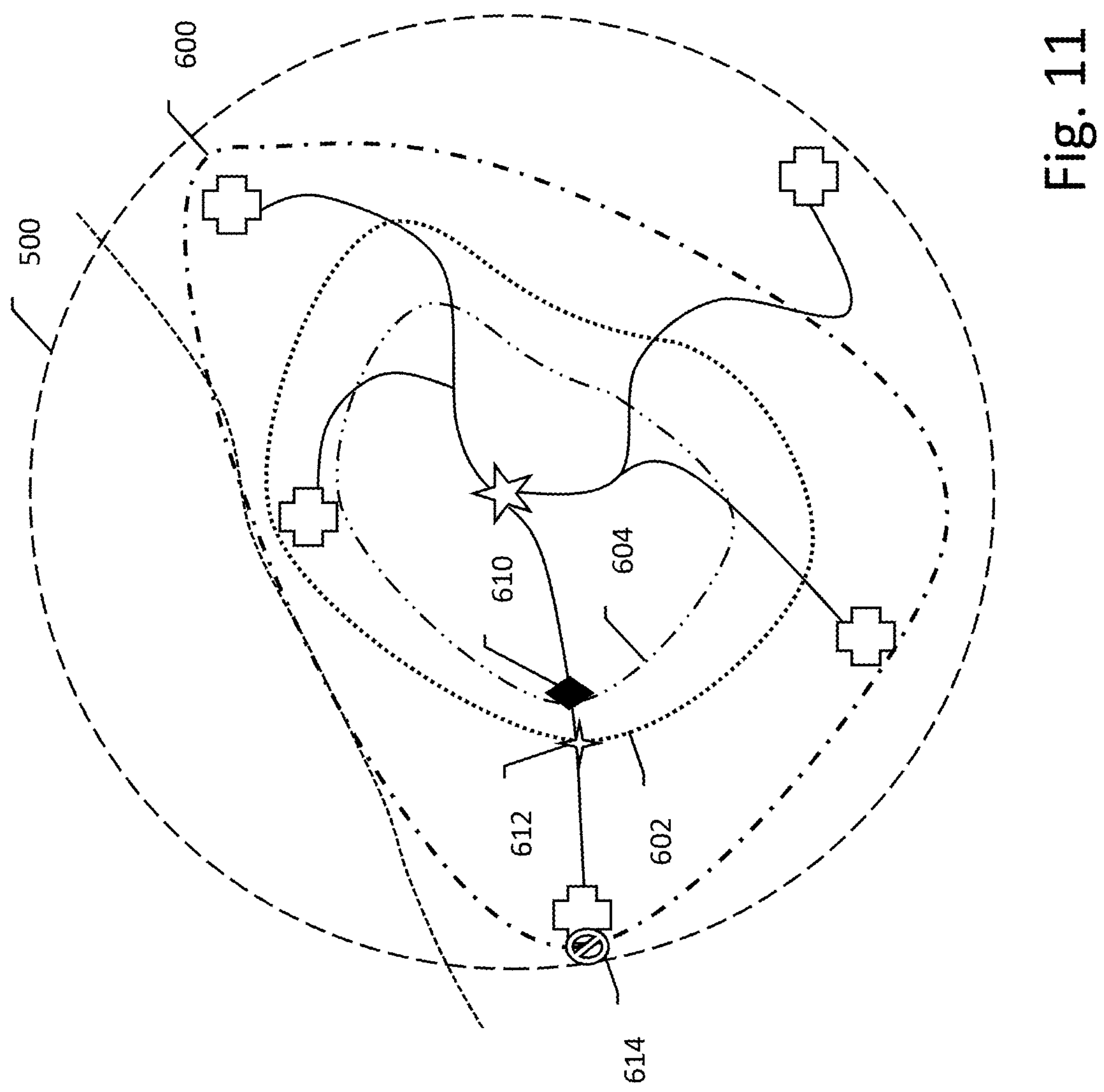

FIGS. 9-11 show illustrative maps. Several aspects of these have been introduced previously, but are summarized here. In FIG. 9, an initial, rough range estimate is made as shown as circle 500, with the current vehicle location shown at 502 in the very center. The radius of the circle 500 may be based, for example, on previous performance of the vehicle, or on a model of maximum vehicle performance, for example, using Equation 1, above. Within the circle, several potential destinations are chosen/identified. For example a potential destination at 510 may be selected. Alternatively, a destination just beyond the circle 500 may be chosen as shown at 512, for example using buffer or margin to determine a maximum distance from the vehicle 502 at which potential destinations can be chose, which then also rules out location 514. Additional potential destinations are shown at 520, 530, 540 and 550. Five potential destinations are chosen in this example, though as few as two may be used, and more than five may also be used, noting that more destinations provide more data but require more memory and computation power (and/or more time for each method iteration to occur).

For each destination 510, 520, 530, 540, 550, at least one potential route to the potential destination is identified, as indicated at 516, 522, 532, 542, and 552. Portions of these routes may overlap, as indicated at 524. Though not shown, more than one route may be identified to a given destination, with any suitable method (time, energy, distance, or user preference such as highway versus surface street, or toll or non-toll road, or use of a weighted summation) used to calculate a SOC consumption sequence for the representative route to each destination. The routes may be broken into segments, using nodes, as shown at 556, 558, for example, allowing segment by segment analysis to be performed. For each node and segment between nodes, the analysis then determines energy usage, which is converted to change in state of charge (SOC) if a battery EV is being analyzed, or to energy source consumption if a fuel is used (gasoline, diesel, hydrogen, etc.). The method then analyzes whether each destination can be reached, and determines where along the route the SOC (or energy course capacity) crosses selected thresholds (such as 30% remaining, 15% remaining, or other numbers). The data that results is then used to determine various metrics, statistics, and/or to present to the user a map of available range.

The method is iterative. Each time the method is performed, it starts with identifying potential destinations. At a high level, as shown in FIG. 9, after a first iteration, areas within the rough circle 500 may be identified in which no analysis was performed in one or more previous iterations, such as areas 560, 562, 564, 566. For a subsequent iteration, these areas may be targeted for selection of new potential destinations. Thus destination 568 may, for example, be favored in a subsequent iteration.

The mapping in FIG. 9 may also provide indications of inaccessible areas, such as that beyond the boundary at 570, which may be a political or geographic boundary, such as a border with the ocean, for example and without limitations.

FIG. 10 illustrates additional details. Here, the outer boundary 500 is again shown, and the region inside is broken into segments. When performing iterative analysis and selecting new potential destinations, the analysis may proceed using these segments and seeking to position new potential destinations so that regions such as those at 580, 582, and 584 can be targeted. Other segments, such as shown at 586, can be identified as inaccessible, and analysis or metrics of coverage of the area inside boundary 500 can be adjusted to account for such inaccessibility. An updated boundary can also be generated, as indicated at 574, providing an indication that some areas are inaccessible due to high SOC or other energy source consumption, as desired, again affecting metrics as well as data that may be reported to the user/driver.

FIG. 11 illustrates how a map may be presented. In some examples sets of boundaries, such as shown at 600, 602, 604 may represent thresholds for remaining SOC or energy source capacity. For example, boundary 600 may be 0% remaining, 602 may be 15% remaining, and 604 may be 25% remaining, or other thresholds. In other words, a two-dimensional SOC consumption map is shown, in the form of a plurality of contours for a plurality of SOC consumption levels, where each of the plurality of contours corresponds to a certain SOC consumption level. The boundaries and/or areas inside and/or outside of the boundaries 600, 602, 604 may be color coded if desired. Alternatively or additionally, the display may show markers along potential routes for different remaining energy source or SOC, such as at 610, 612, and 614. For example, marker 610 may represent a point in the route where the battery SOC is predicted to cross a first threshold, and marker 612 may likewise represent a point in the route where the battery SOC is predicted to cross a second threshold, as desired. Color coding of the route path may be used instead or in addition to the markers shown; the transition from one color to another may be considered a "marker" indicating crossing of a battery SOC threshold.

Presenting the map to a user is one step that may be performed and repeated with iterations of the modelling and calculation steps. The user may, in some examples, enter a potential or desired destination, and, in response, the system may indicate based on the underlying analysis, whether that destination can be reached without requiring battery charging and/or re-fueling. When battery charging is needed to reach a user-input destination, the system may use the above generated map to further identify and/or recommend locations for battery charging (or re-fueling for non-battery vehicles). Such an identification step can include the use of obtained navigational/map information, which will indicate which of the simulated routes/nodes has a recharging/re-fueling station thereon. Further, to the extent the user-input destination is known, then the system-simulated route to that user-input destination can be obtained and used to determine which recharging/re-fueling station(s) minimize (in terms of distance, travel time, energy used, or other selected factor) excursions from the route to the user-input destination. In some examples, the system can recommend one or more recharging/re-fueling stations that minimize the number of times the vehicle needs to charge/re-fuel while travelling to a user-input destination.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls. The terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A method of generating estimates of end of range for an electric vehicle, the vehicle comprising an electric motor providing drive power to the vehicle, a battery that provides current to the electric motor to use in providing drive power, a user screen for displaying a map to a user, and a controller configured to obtain map information and generate a map on the user screen, comprising:

determining each of a current location of the electric vehicle using the map information, and a state of charge (SOC) of the battery;

using the determined current location and SOC of the battery:

a) identifying a plurality of potential destinations around the current location;

b) determining route information for each of the plurality of potential destinations;

c) simulating a prediction model for each of the plurality of potential destinations which predicts SOC of the battery along potential routes to each of the plurality of potential destinations using the route information;

d) calculating and displaying to the user via the user screen a battery SOC consumption map based on the predicted SOC of the battery along the potential routes, the battery SOC consumption map including, for each of the plurality of potential destinations, a graphical indication of at least one of (i) a portion of a corresponding potential route at which the SOC is predicted to cross a reserve threshold and (ii) a portion of the potential route at which the SOC is predicted to be insufficient to reach the potential destination;

by the controller, automatically controlling a navigation guidance function based on the battery SOC consumption map by:

(i) suppressing from presentation on the user screen potential destinations having no corresponding potential route on which the SOC is predicted to remain above the reserve threshold, and (ii) prioritizing guidance to remaining potential destinations according to predicted SOC at arrival; and wherein identifying the plurality of potential destinations is performed automatically by the controller without obtaining a destination input from the user.

2. The method of claim 1, further comprising displaying on the battery SOC consumption map at least one range indicator each indicating a location at which the battery SOC is predicted to cross a first boundary.

3. The method of claim 2, wherein the at least one range indicator includes:

a first range indicator on a first potential route to a first potential destination, the first range indicator showing where on the first potential route the battery SOC is predicted to cross a first boundary; and a second range indicator on a second potential route to a second potential destination, the second range indicator showing where on the second potential route the battery SOC is predicted to cross a first boundary.

4. The method of claim 1, wherein calculating the map comprises interpolation using route information for at least two of the plurality of potential destinations to predict battery SOC at a location not simulated with the prediction model.

5. The method of claim 1, wherein simulating a prediction model for each of the plurality of potential destinations uses the route information by accounting for at least one of traffic, grade, and curvature of the potential route.

6. The method of claim 1, wherein each of steps a), b), c) and d) are performed as a first iteration of the method, and the method further comprises, after completing the first iteration, determining a new location and a new state of the battery and performing a second iteration of the method, wherein step a) in the second iteration is performed by:

determining an estimated maximum distance the vehicle can travel with the new state of the battery;

defining a plurality of segments within a region having a radius determined from the estimated maximum distance;

categorizing the plurality of segments into filled and unfilled segments by identifying segments as filled if routes from the vehicle to the potential destinations from the first iteration are contained in the segments, and otherwise as unfilled; and identifying a plurality of potential destinations in the second iteration by targeting the unfilled segments.

7. The method of claim 1, wherein step a) is performed by first determining unreachable locations around the vehicle, and omitting the unreachable locations from consideration when identifying the plurality of potential destinations.

8. The method of claim 1, wherein step a) is performed by applying one or more rules to space the potential destinations from one another.

9. The method of claim 1, wherein step a) is performed without obtaining a destination from the user.

10. The method of claim 1, wherein the method is performed iteratively such that a memory associated with the controller stores a set of previously analyzed potential destinations, and step a) is performed by:

defining segments in a map region surrounding the vehicle;

identifying first segments which do not contain a previously analyzed potential destination; and identifying the potential destinations in the first segments.

11. The method of claim 10, wherein the memory updates the set of previously analyzed potential destinations on a first-in, first-out basis.

12. The method of claim 1, further comprising:

determining from the predicted SOC along each potential route a minimum range based on the battery SOC;

determining from the predicted SOC along each potential route a maximum range based on the battery SOC; and presenting the minimum range and maximum range to the user of the vehicle.

13. The method of claim 1, further comprising determining from the predicted SOC along each potential route a non-directional range of the vehicle as a function of the vehicle range on each potential route, and presenting the non-directional range to the user.

14. The method of claim 1, wherein the method is performed iteratively such that a memory associated with the controller stores a set of previously analyzed potential destinations and associated simulated routes, and the method further comprises:

using a current direction of vehicle motion to assign, for each stored route, a probability that the vehicle will travel along that stored simulated route in a next driving interval, the probability being a function of at least heading alignment between the stored simulated route and the current direction of vehicle motion;

calculating a directional range of the vehicle using a probability-weighted average of all simulated routes; and presenting the directional range of the vehicle to the user.

15. A controller for an electric vehicle, the electric vehicle having an electric motor providing drive power, a battery that provides current to the electric motor to use in providing drive power, a user screen for displaying a map to a user, the controller configured to obtain map information and generate a map on the user screen, the controller comprising one or more processors and a memory stored instructions that, when executed, executed cause the controller to perform the method of claim 1, including automatically controlling a navigation guidance function based on the battery SOC consumption map by suppressing unreachable potential destinations and prioritizing reachable potential destinations according to predicted SOC at arrival.

16. An electric vehicle comprising an electric motor providing drive power, a battery that provides current to the electric motor to use in providing drive power, a user screen for displaying a map to a user and the controller of claim 15.

17. A method of generating estimates of end of range for a vehicle, the vehicle having an engine consuming a fuel, a fuel tank having a capacity and containing a quantity of fuel, a user screen for displaying a map to a user, and a controller configured to obtain map information and generate a map on the user screen, the method comprising:

determining each of a current location of the electric vehicle using the map information, and a quantity of fuel in the fuel tank;

using the determined current location and the determined quantity of fuel:

a) identifying a plurality of potential destinations around the current location;

b) determining route information for each of the plurality of potential destinations;

c) simulating a prediction model for each of the plurality of potential destinations which predicts remaining quantity of fuel in the fuel tank along a potential route to each of the plurality of potential destinations using the route information; and d) calculating and reporting to the user via the user screen a fuel consumption map based on the predicted fuel consumption along the potential routes.

18. The method of claim 17, wherein the method is performed iteratively such that a memory associated with the controller stores a set of previously analyzed potential destinations and associated simulated routes, and the method further comprises:

using a direction of vehicle motion to assign a set of probabilities to simulated routes for each of the stored set of previously analyzed potential destinations;

calculating a directional range of the vehicle using a probability-weighted average of all simulated routes; and presenting the directional range of the vehicle to the user.

19. The method of claim 17, wherein step a) is performed without obtaining a destination from the user.

20. The method of claim 17, wherein the method is performed iteratively such that a memory associated with the controller stores a set of previously analyzed potential destinations, and step a) is performed by:

defining segments in a map region surrounding the vehicle;

identifying first segments which do not contain a previously analyzed potential destination; and identifying the potential destinations in the first segments.

* * * * *